US012675062B2

(12) United States Patent
Isobe

(10) Patent No.: US 12,675,062 B2
(45) Date of Patent: Jul. 7, 2026

(54) DEVELOPER ACCOMMODATING CONTAINER AND IMAGE FORMING APPARATUS

(71) Applicant: CANON KABUSHIKI KAISHA, Tokyo (JP)

(72) Inventor: Keisuke Isobe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/978,480

(22) Filed: Dec. 12, 2024

(65) Prior Publication Data

US 2025/0208537 A1 Jun. 26, 2025

(30) Foreign Application Priority Data

Dec. 23, 2023 (JP) ................................. 2023-217492

(51) Int. Cl.
*G03G 15/08* (2006.01)
*G03G 21/00* (2006.01)

(52) U.S. Cl.
CPC ..... *G03G 15/0881* (2013.01); *G03G 15/0894* (2013.01); *G03G 15/0898* (2013.01); *G03G 21/0029* (2013.01); *G03G 2215/00991* (2013.01); *G03G 2221/1606* (2013.01); *G03G 2221/1648* (2013.01)

(58) Field of Classification Search
CPC ........... G03G 15/0881; G03G 15/0898; G03G 15/0894; G03G 21/0029; G03G 2215/00991; G03G 2221/1606; G03G 2221/1648
See application file for complete search history.

(56) References Cited

U.S. PATENT DOCUMENTS

| | | | | |
|---|---|---|---|---|
| 9,366,996 | B2 | 6/2016 | Harada | |
| 10,725,400 | B2 | 7/2020 | Gamo | |
| 10,884,371 | B2 | 1/2021 | Okino | |
| 11,480,913 | B2 | 10/2022 | Okino | |
| 11,852,991 | B2 | 12/2023 | Gamo | |
| 12,038,713 | B2 | 7/2024 | Okino | |
| 2015/0234324 | A1 | 8/2015 | Harada | |
| 2017/0269506 | A1* | 9/2017 | Morita | G03G 15/0898 |
| 2018/0120731 | A1* | 5/2018 | Nakamura | G03G 15/0881 |

(Continued)

FOREIGN PATENT DOCUMENTS

| | | |
|---|---|---|
| JP | 2015-172717 A | 10/2015 |
| JP | 2016-045268 A | 4/2016 |

(Continued)

*Primary Examiner* — Joseph S Wong
(74) *Attorney, Agent, or Firm* — Venable LLP

(57) ABSTRACT

A developer accommodating container includes first and second members, and first and second seals. The first member includes one end portion and the other end portion in a first direction. At least a part of the one end portion of the first seal is nipped between the first member and the second member in a state of being superposed on the second seal. The one end portion of the first seal includes first, second, third, and fourth ridge lines. At least one of a first corner formed by the first ridge line and the second ridge line and a second corner formed by the third ridge line and the fourth ridge line is nipped between the first member and the second member so as to be elastically deformed in a state of being superposed on the second seal.

17 Claims, 20 Drawing Sheets

(56) References Cited

U.S. PATENT DOCUMENTS

| | | | | |
|---|---|---|---|---|
| 2022/0163904 | A1 * | 5/2022 | Anzai | B65D 47/28 |
| 2024/0069468 | A1 | 2/2024 | Gamo | |
| 2024/0329593 | A1 | 10/2024 | Okino | |

FOREIGN PATENT DOCUMENTS

| | | | |
|---|---|---|---|
| JP | 2016-167046 | A | 9/2016 |
| JP | 2018-091892 | A | 6/2018 |

* cited by examiner (a)

(b)

DEVELOPER ACCOMMODATING CONTAINER AND IMAGE FORMING APPARATUS

FIELD OF THE INVENTION AND RELATED ART

The present invention relates to a developer accommodating container for use with an image forming apparatus, using an electrophotographic type or an electrostatic recording type, such as a copying machine, a printer, a facsimile machine, or a multi-function machine having a plurality of functions of these machines, and the image forming apparatus including the developer accommodating container.

The image forming apparatus using the electrophotographic type obtains a product (print) by transferring a developer image, formed on an image bearing member by a developer, onto a recording material such as paper, and then by fixing the developer image on the recording material. In such an image forming apparatus, the developer is accommodated (including that the developer passes) according to temporarily in a developing device for developing an electrostatic latent image, a cleaning device for removing the developer remaining on the image bearing member after the developer image is transferred from the image bearing member onto a transfer receiving member, a developer supplying container for accommodating the developer for being supplied to the developing device, a developer collecting container for accommodating the developer collected from the cleaning device, and a developer accommodating device such as a developer conveying portion or the like between the cleaning device and the developer collecting container. A unit including the developer supplying container and the developing device, a unit including the cleaning device, and the developer collecting container and the like are made a cartridge detachably mountable to an apparatus main assembly of the image forming apparatus in many instances (cartridge type).

In the image forming apparatus employing the cartridge type, it is desired that during mounting and demounting of the cartridge relative to the apparatus main assembly of the image forming apparatus, or the like, deposition of the developer on an operator and scattering of the developer due to leakage of the developer, accommodated inside the cartridge, to an outside of the cartridge is suppressed. For that reason, in such an image forming apparatus, flow-out of the developer from the cartridge is suppressed by providing a seal member between frames or parts constituting the cartridge. Further, even in an image forming apparatus in which the cartridge type is employed, there is a possibility that when the developer flows out to an outside from a unit in which the developer is accommodated in the image forming apparatus, an inside of the image forming apparatus is contaminated and an adverse influence is exerted on image formation. For that reason, similarly in the above, the seal member is disposed between the frames or the parts constituting the unit, and thus the flow-out of the developer from the unit is suppressed.

As the seal member, an elastic member such as an urethane foam (sponge), a soft rubber, or an elastomer resin is used in many instances. Further, the seal member is provided in a bonding (connecting) portion between the frames or the parts, and is compressed and deformed with a predetermined squeeze amount. By this, the seal member fills and seals a gap between the frames or the parts (members), and thus it becomes possible to suppress that the developer flows out through the gap.

In order to seal a region in which the developer exists as described above, a constitution in which the seal member is disposed so as to enclose the region and is compressed and deformed is used in many instances. At this time, when the region in which the developer exists is enclosed by a single seal member, the seal member itself becomes large or waste in material taking is liable to occur, thus leading to an increase in cost of the seal member in some instances. For that reason, in order to seal the developer existing region, for example, a constitution in which the region is enclosed by a plurality of seal members each having a rectangular shape in cross section is used in some instances.

Here, in the constitution in which the developer existing region is enclosed by the plurality of seal members, due to a manufacturing error (sticking error or the like of the seal members) or a tolerance of the seal member itself, when a gap is generated between the plurality of seal members, there is a possibility that the developer flows out through the gap. Therefore, in Japanese Laid-Open Patent Application (JP-A) 2016-45268, a constitution in which end portions of a plurality of seal members are superposed on each other is proposed.

However, as described in JP-A 2016-45268, in the constitution in which the seal member and the seal member are superposed on each other, the seal member on which another seal member is superposed between itself and a seal member squeezing member (frame, part, or the like) cannot sufficiently follow the seal member squeezing member in some instances. In that case, in the portion where the seal member cannot follow the seal member squeezing member, the gap is generated between the seal members, so that there is a possibility that the developer flows out to an outside through the gap.

Particularly, when the cartridge or the image forming apparatus is prolonged in lifetime, an accumulation amount the developer flowed out tends to increase, so that there is a need to move strictly suppress the flow-out of the developer from the developer existing region to the outside.

SUMMARY OF THE INVENTION

Therefore, a principal object of the present invention is to enhance reliability of a sealing performance in a constitution in which a plurality of seal members are used for sealing a region in which a developer exists.

This object is accomplished by a developer accommodating container and an image forming apparatus which are according to the present invention.

According to an aspect of the present invention, there is provided a developer accommodating container comprising: a first member configured to form an accommodating portion for accommodating a developer; a second member mounted to the first member and configured to form the accommodating portion; a first seal extended along a first direction at a periphery of the accommodating portion and configured to seal between the first member and the second member by being nipped between the first member and the second member so as to be elastically deformed; and a second seal extended along a second direction crossing the first direction at the periphery of the accommodating portion and configured to seal between the first member and the second member by being nipped between the first member and the second member so as to be elastically deformed, wherein the first seal includes one end portion and the other end portion with respect to the first direction, wherein at least a part of the one end portion of the first seal is nipped between the first member and the second member so as to be elastically deformed in a state of being superposed on the second seal, wherein the one end portion of the first seal includes a first ridge line extending along the first direction, a second ridge line extending from the first ridge line along a direction crossing the first ridge line so as to be spaced from the accommodating portion in the second direction, a third ridge line extending from the second ridge line along a direction crossing the second ridge line, and a fourth ridge line extending from the third ridge line along a direction crossing the third ridge line so as to be spaced from the accommodating portion in the second direction, wherein a first corner formed by the first ridge line and the second ridge line is positioned closer to the other end portion of the first seal than a second corner formed by the third ridge line and the fourth ridge line is, wherein an interval between the first corner and the second corner in the first direction is shorter than a width, in the first direction, of a region where the first seal is superposed on the second seal, and wherein at least one of the first corner and the second corner is nipped between the first member and the second member so as to be elastically deformed in a state of being superposed on the second seal.

According to another aspect of the present invention, there is provided an image forming apparatus including the developer accommodating container.

Further features of the present invention will become apparent from the following description of exemplary embodiments with reference to the attached drawings.

Figure 5:
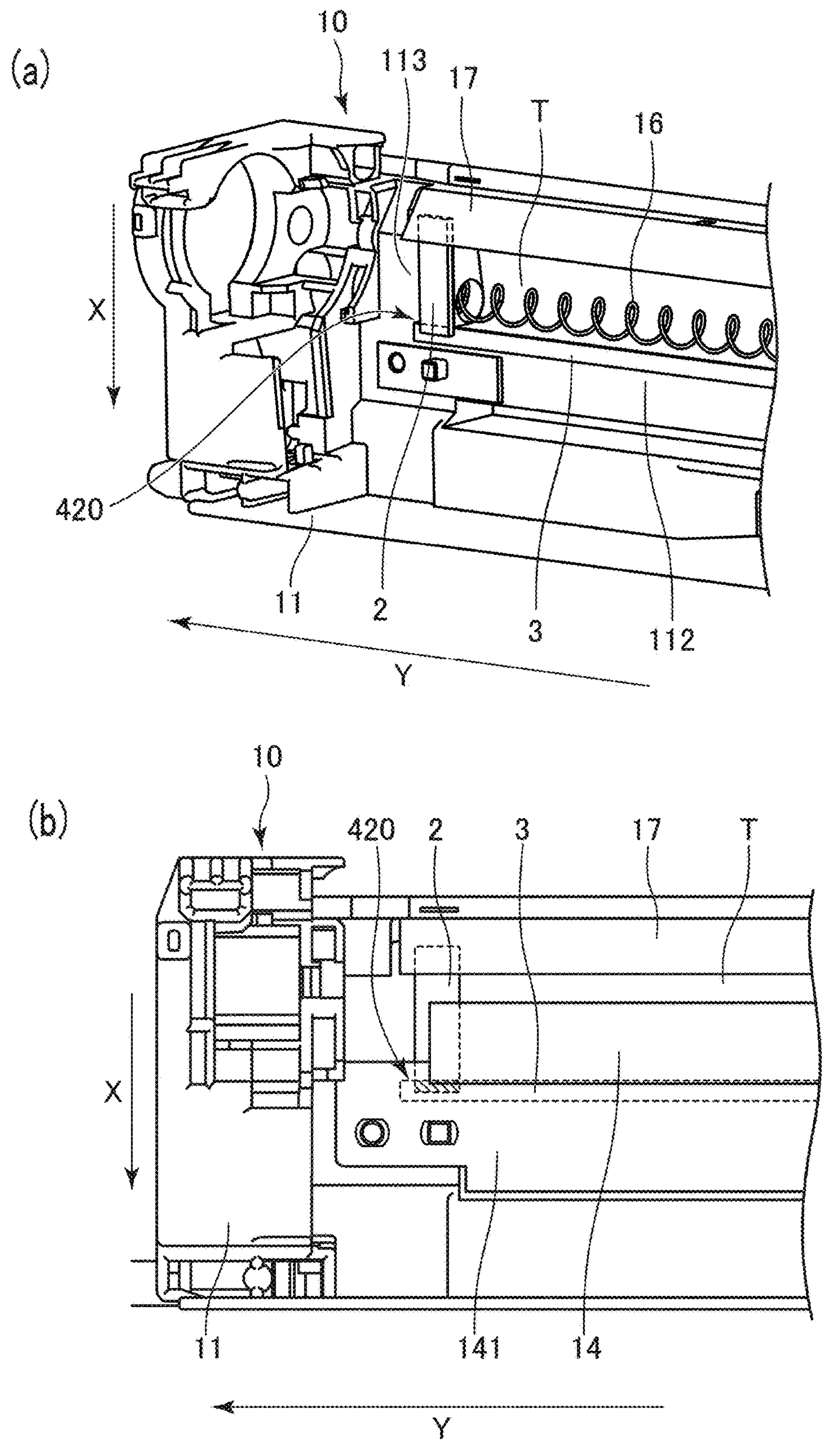

Parts (a) and (b) of FIG. 5 are a perspective view and a front view, respectively, of a part of the drum unit to which a conventional side seal is mounted.

Figure 6:
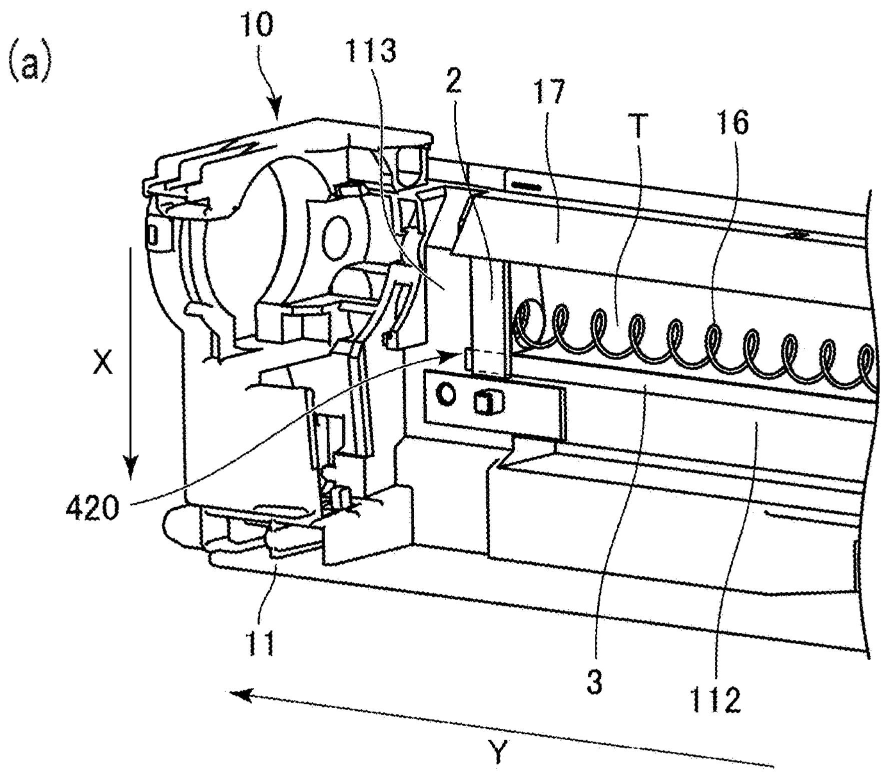
Figure 6:
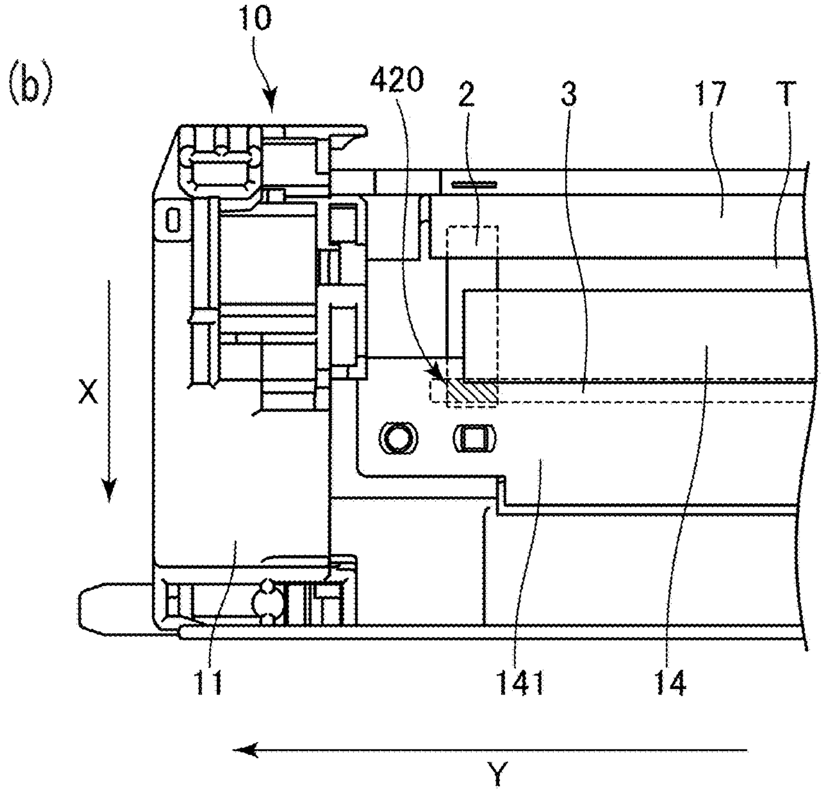

Parts (a) and (b) of FIG. 6 are a perspective view and a front view, respectively, of a part of the drum unit to which a conventional side seal is mounted.

Figure 7:
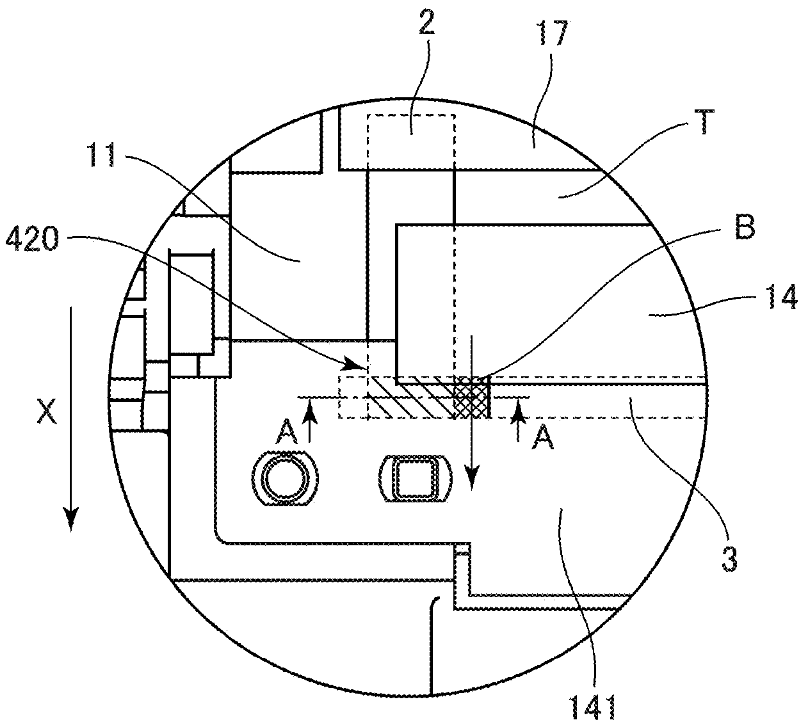
Figure 7:
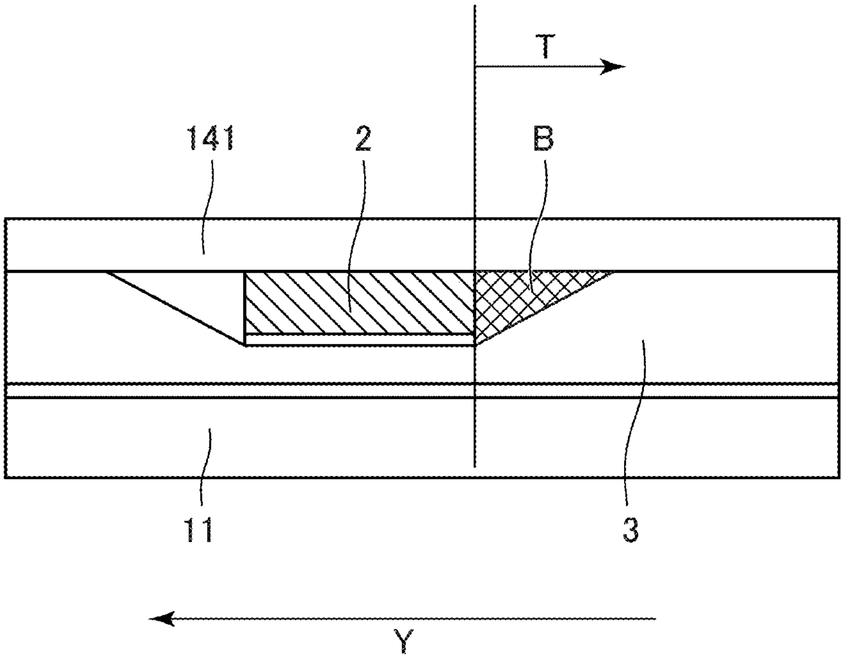

Parts (a) and (b) of FIG. 7 are an enlarged front view and a sectional view, respectively, of the drum unit, to which the conventional side seal is mounted, in the neighborhood of the conventional side seal.

Figure 8:
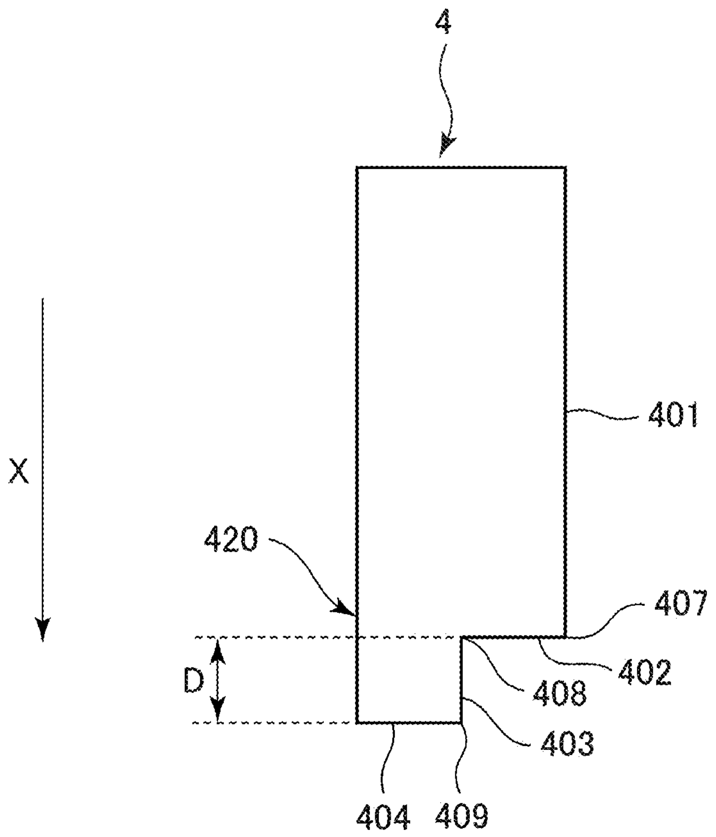

FIG. 8 is a front view of a side seal in an embodiment.

Figure 9:
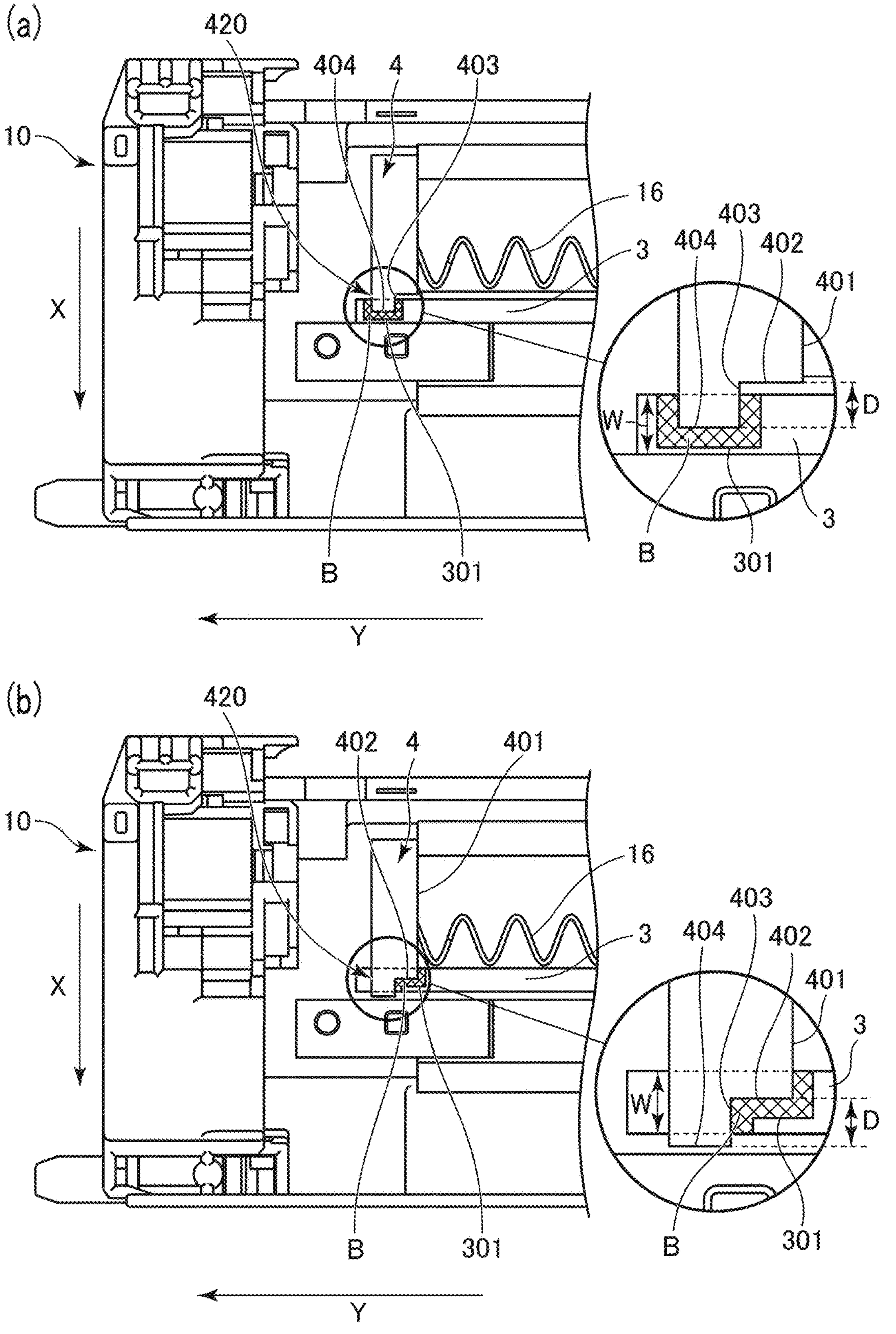

Parts (a) and (b) of FIG. 9 are front views of a part of the drum unit showing states different in mounting position of the side seals.

Figure 10:
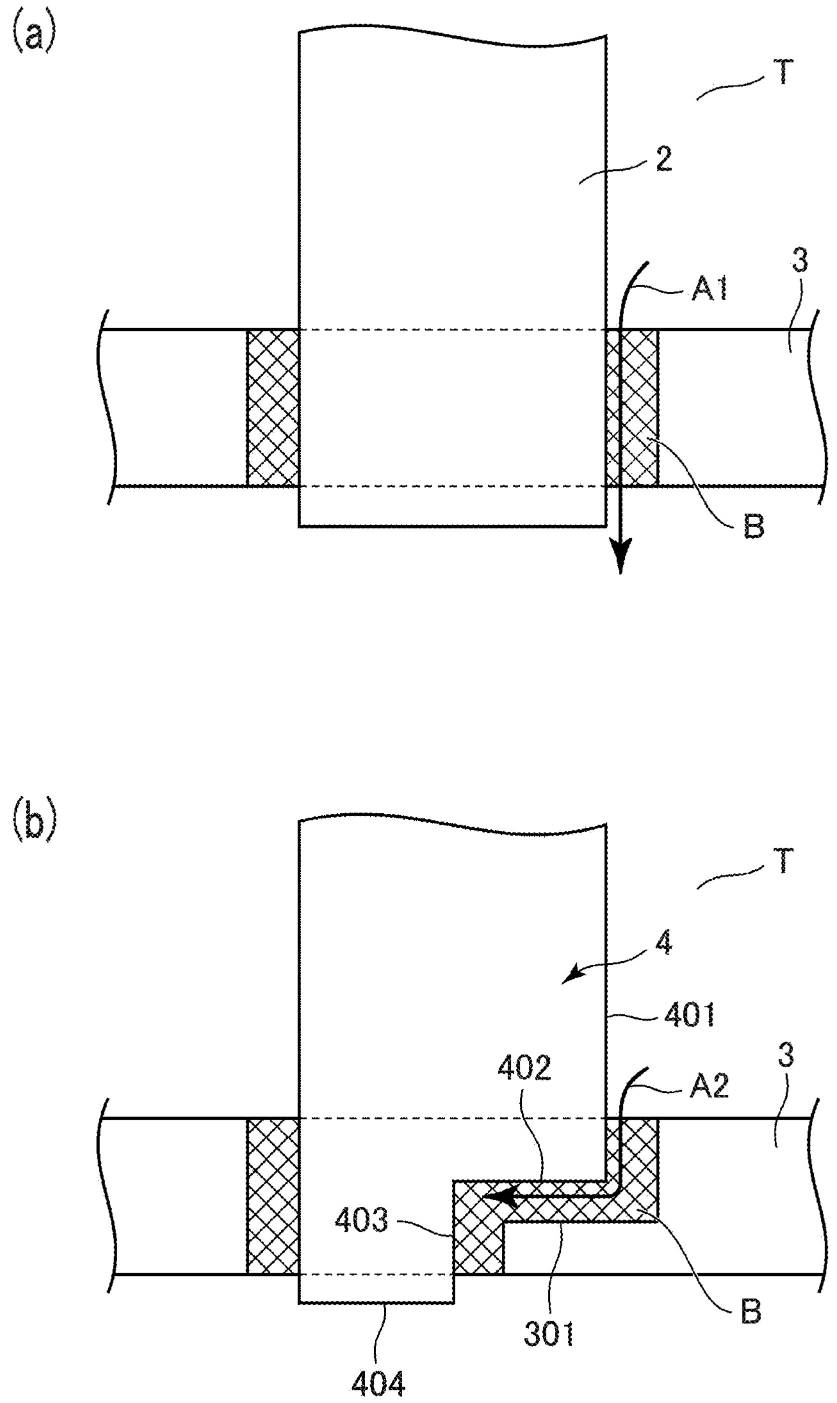

Parts (a) and (b) of FIG. 10 are front views each in the neighborhood of the side seal for illustrating a sealing effect of the side seal in the embodiment.

Figure 11:
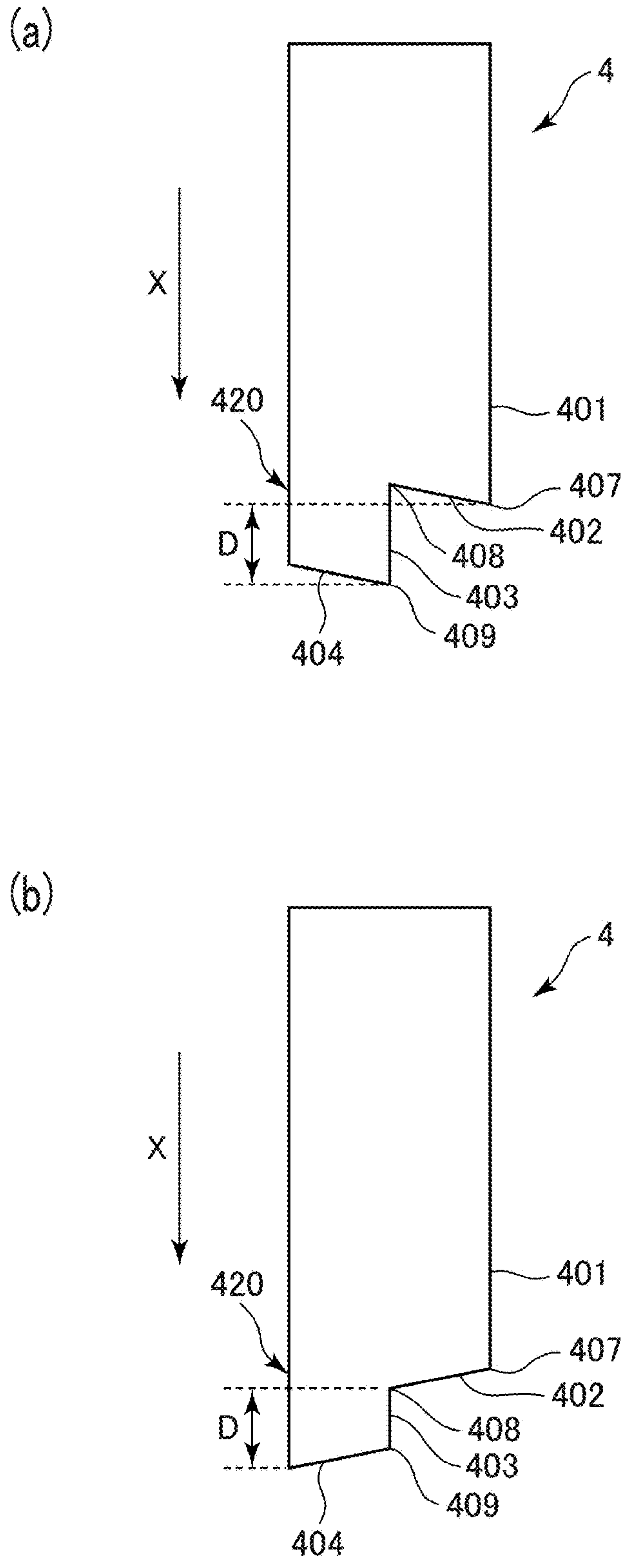

Parts (a) and (b) of FIG. 11 are front views each showing a modified embodiment of the side seal.

Figure 12:
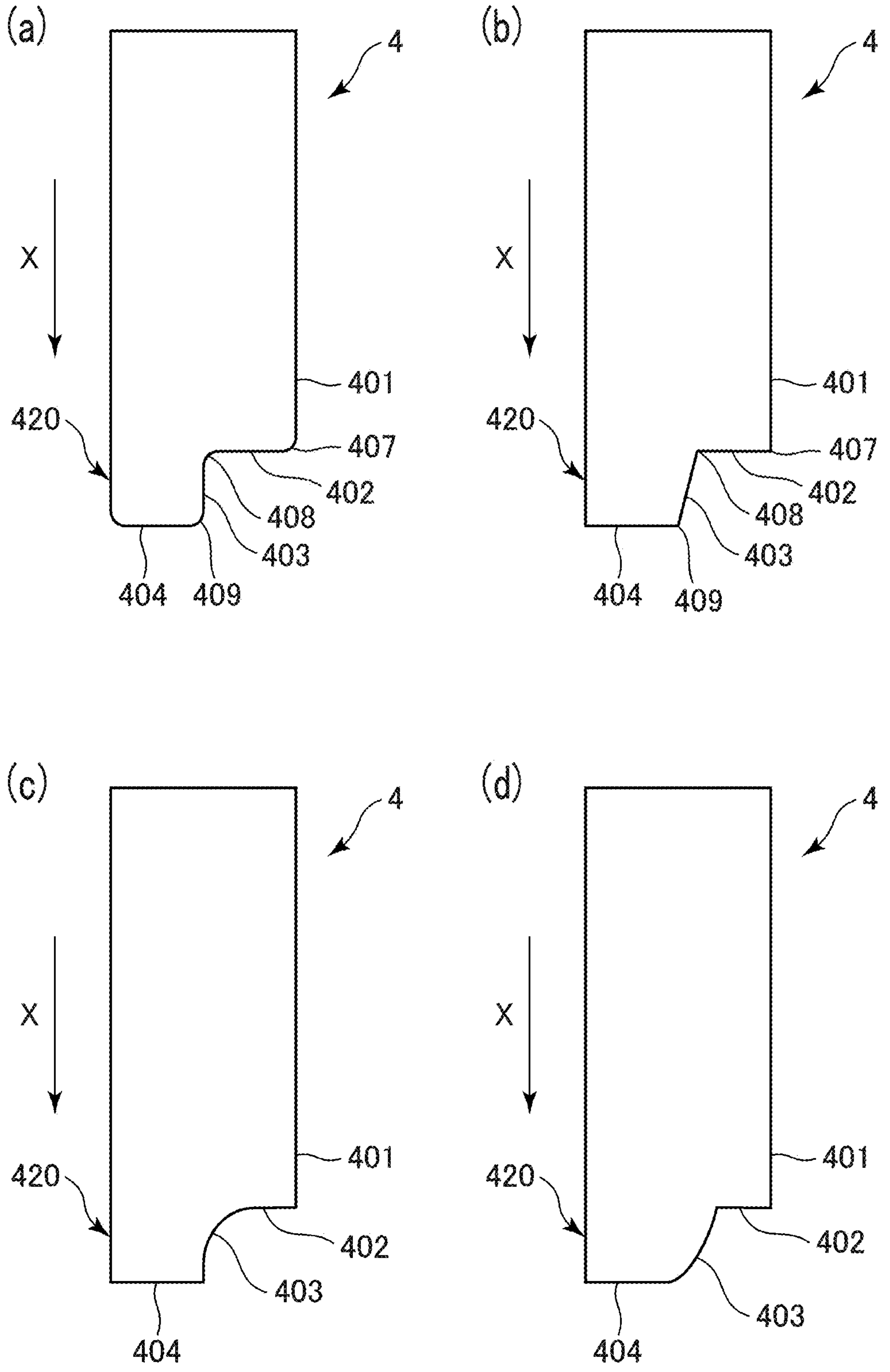

Parts (a) to (d) of FIG. 12 are front views each showing a modified embodiment of the side seal.

Figure 13:
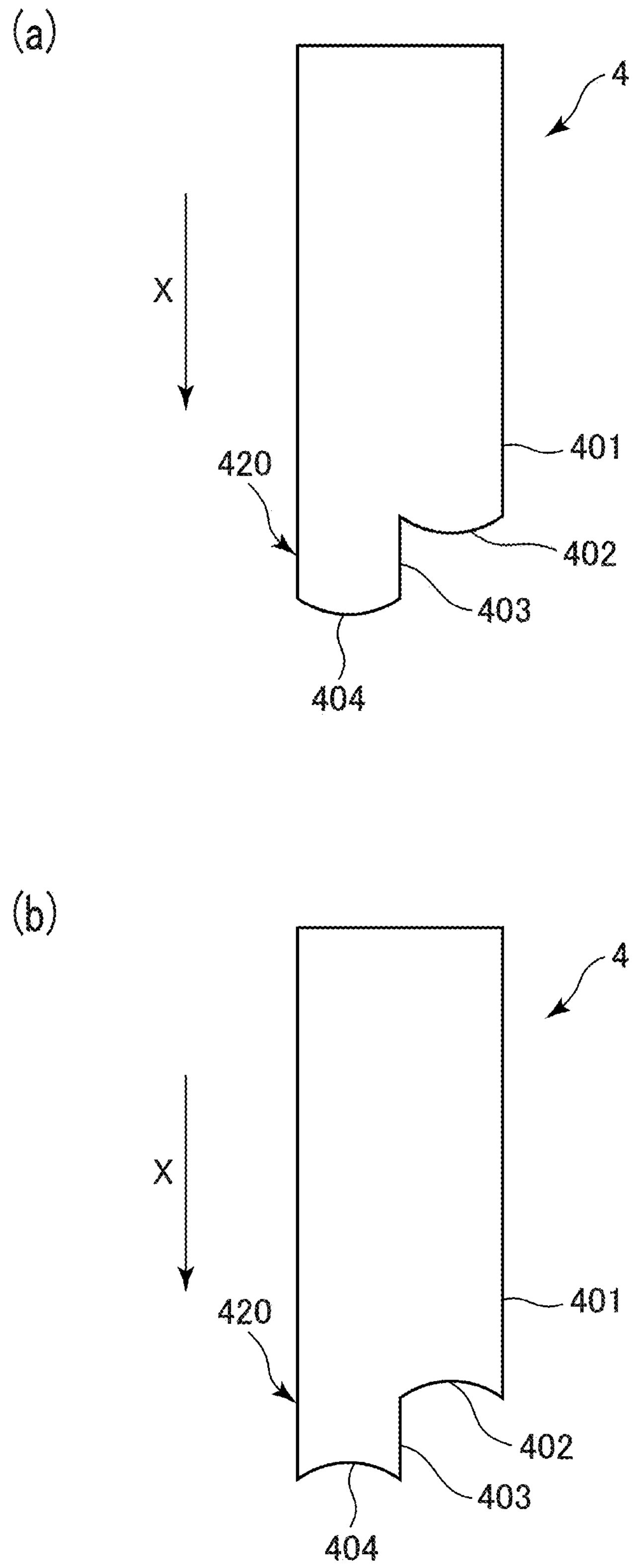

Parts (a) and (b) of FIG. 13 are front views each showing a modified embodiment of the side seal.

Figure 14:
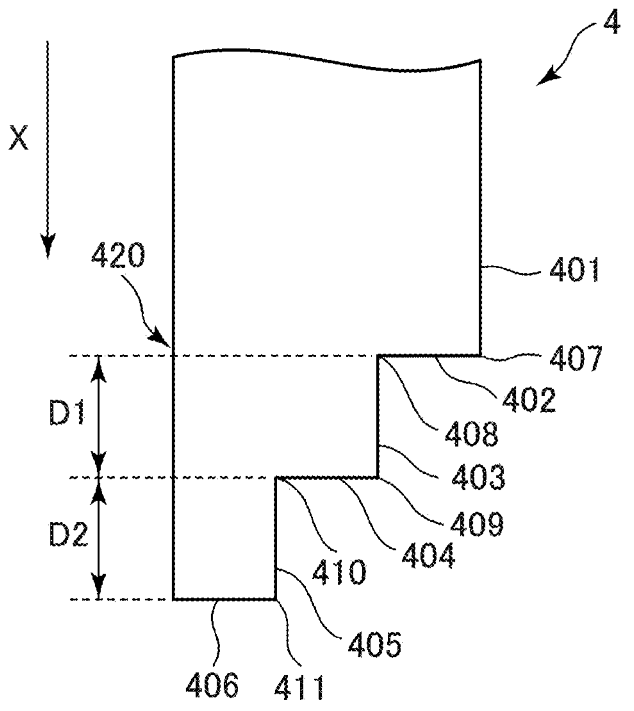

FIG. 14 is a front view showing a modified embodiment of the side seal.

Figure 15:
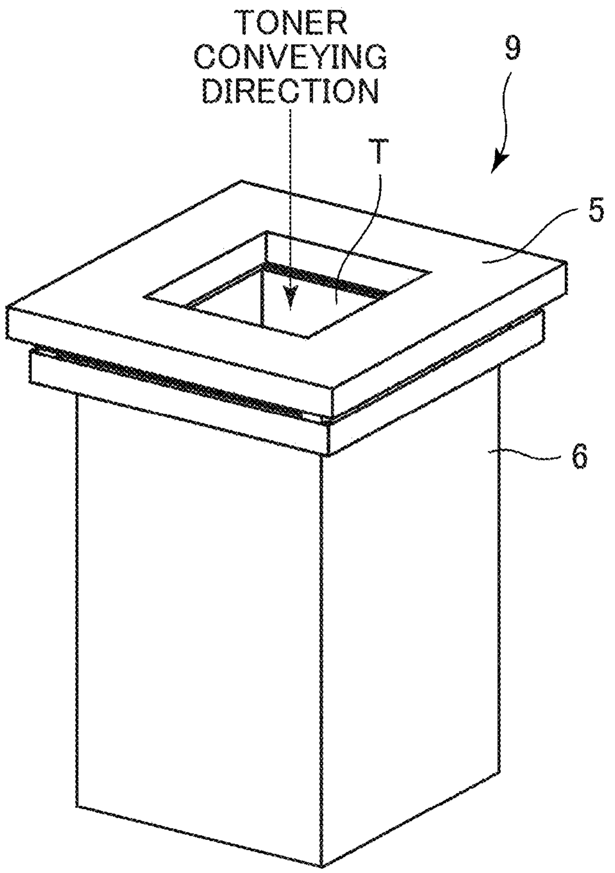

FIG. 15 is a perspective view of an outer appearance of a toner conveying portion in an embodiment 2.

Figure 16:
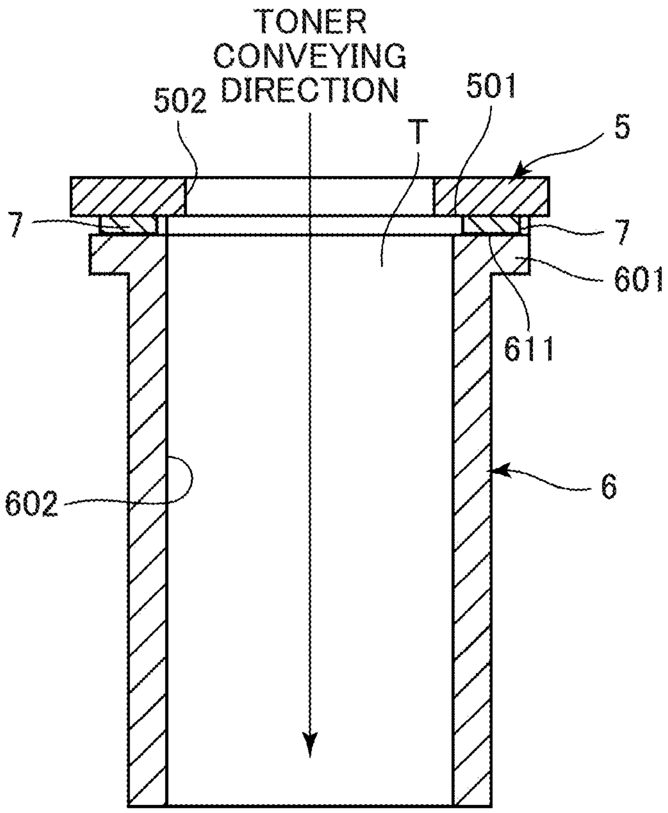

FIG. 16 is a schematic sectional view of the toner conveying portion in the embodiment 2.

Figure 17:
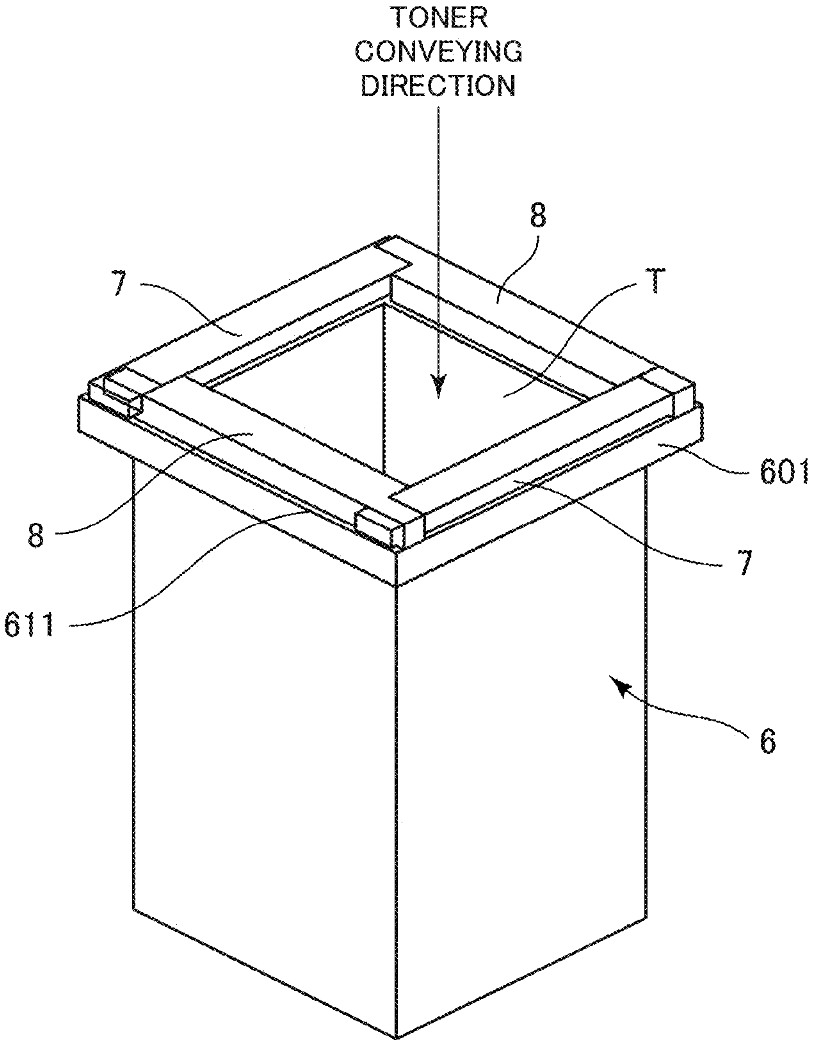

FIG. 17 is a schematic perspective view of a part of the toner conveying portion showing a sealing structure in the embodiment 2.

Figure 18:
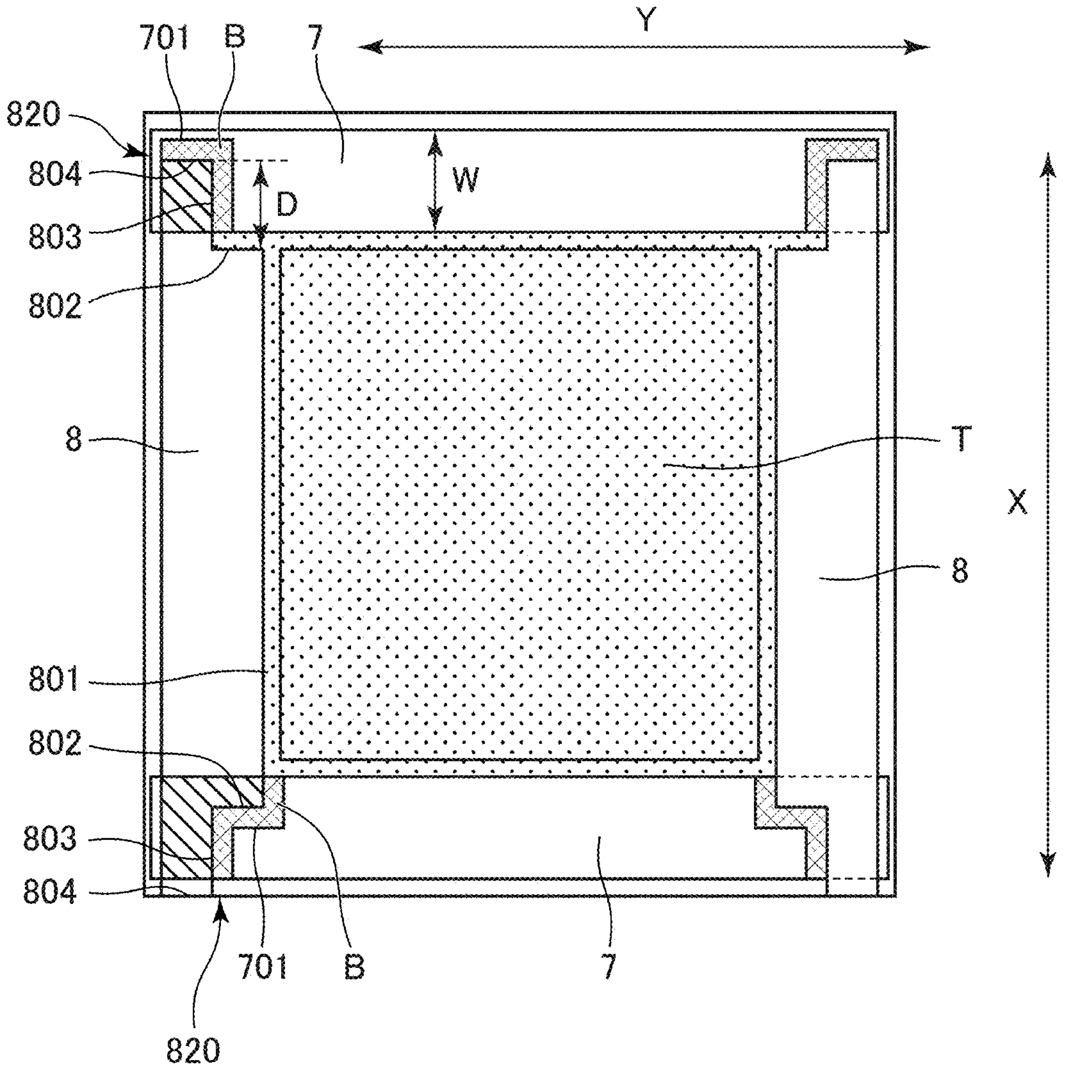

FIG. 18 is a front view of a part of the toner conveying portion showing the sealing structure in the embodiment 2.

Figure 19:
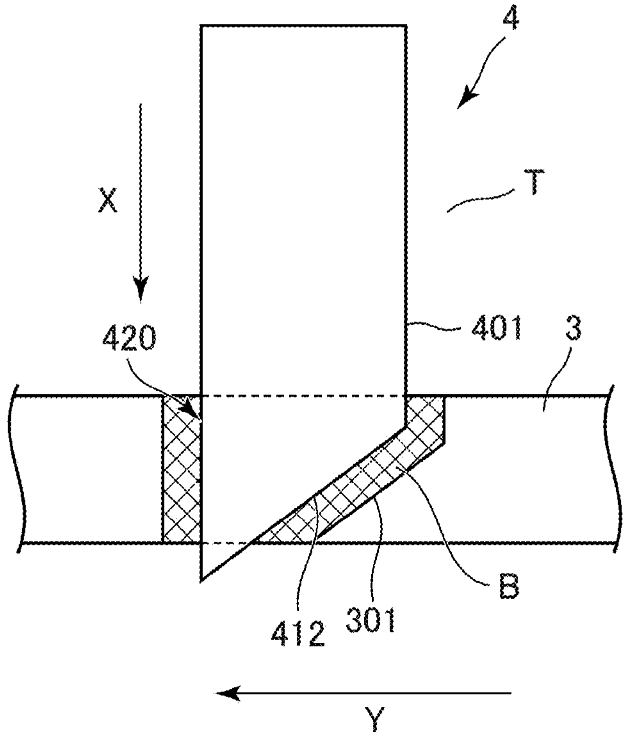

FIG. 19 is a front view showing a modified embodiment of a side seal.

Figure 20:
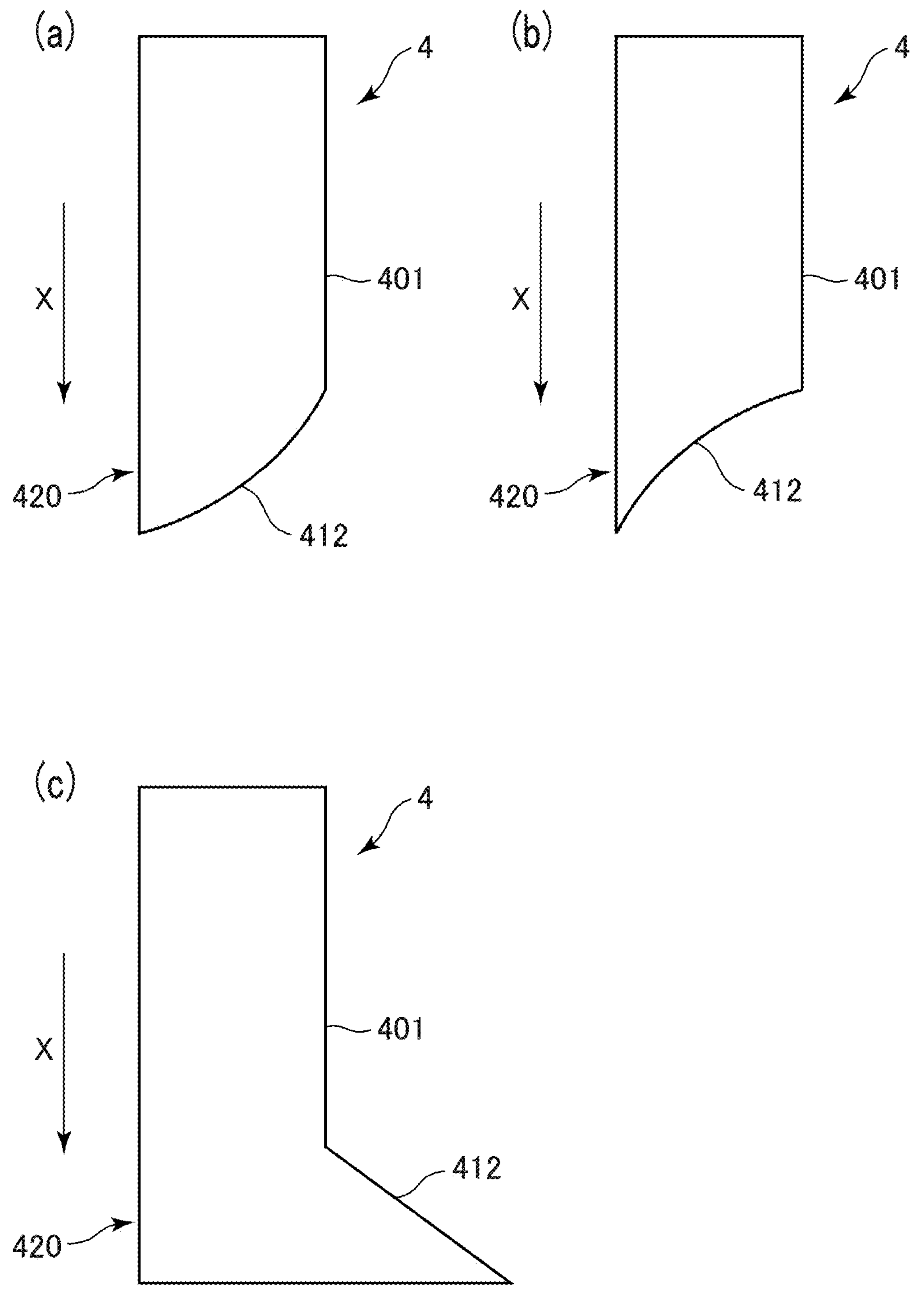

Parts (a), (b) and (c) of FIG. 20 are front views each showing a modified embodiment of the side seal.

DESCRIPTION OF THE EMBODIMENTS

In the following, a developer accommodating container and an image forming apparatus which are according to the present invention will be described further specifically with reference to the drawings.

Embodiment 1

1. General Structure and Operation of Image Forming Apparatus

Figure 1:
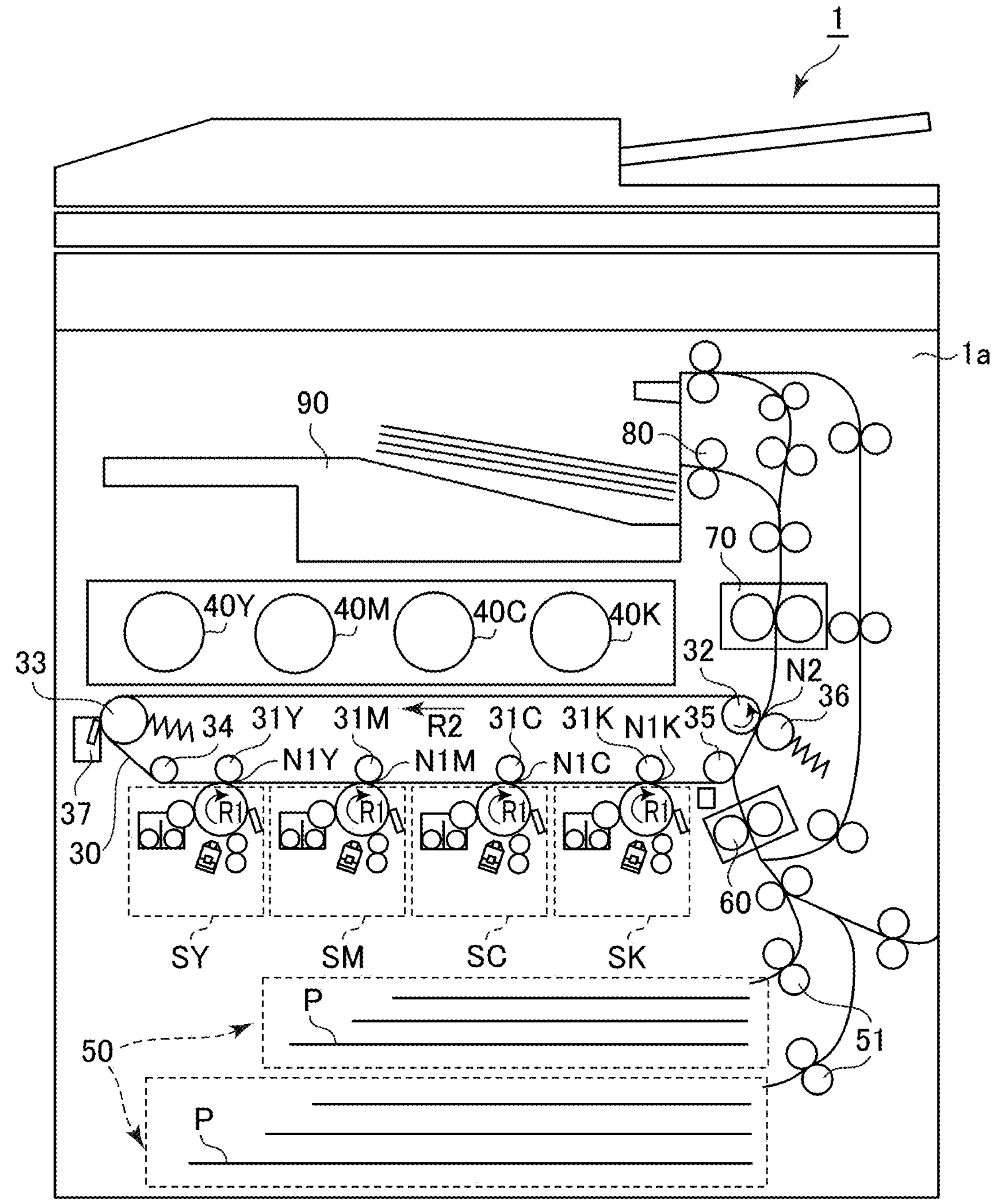
FIG. 1 is a schematic sectional view of an image forming apparatus.

First, a general structure and an operation of an image forming apparatus 1 of an embodiment 1 will be described. FIG. 1 is a schematic sectional view of the image forming apparatus 1 of this embodiment (shows a cross section substantially perpendicular to a rotational axis direction of a photosensitive drum 12 described later). The image forming apparatus 1 of this embodiment is a tandem-type copying machine (having function of a copying machine, a printer, and a facsimile machine) which is capable of forming a full-color image with use of an electrophotographic type and which employs an intermediary transfer type. The image forming apparatus 1 is capable of forming an image on a sheet-like recording material (transfer material, sheet, recording medium) P such as paper depending on image signal (image formation) transmitted from an external device such as a personal computer, for example.

Here, as regards the image forming apparatus and elements thereof, in FIG. 1, a front side of the drawing sheet is referred to as a "front (front surface) side", and a rear side of the drawing sheet is referred to as a "rear (rear surface) side". A front-rear direction connecting the front side and the rear side is substantially parallel to the rotational axis direction of the photosensitive drum 12. Further, as regards the image forming apparatus 1 and the elements thereof, an up-down direction refers to an up-down direction of a gravitational direction (vertical direction), but does not mean immediately above and immediately below, respectively, and includes an upper side and a lower side than a horizontal plane passing through a noted element or position.

Figure 2:
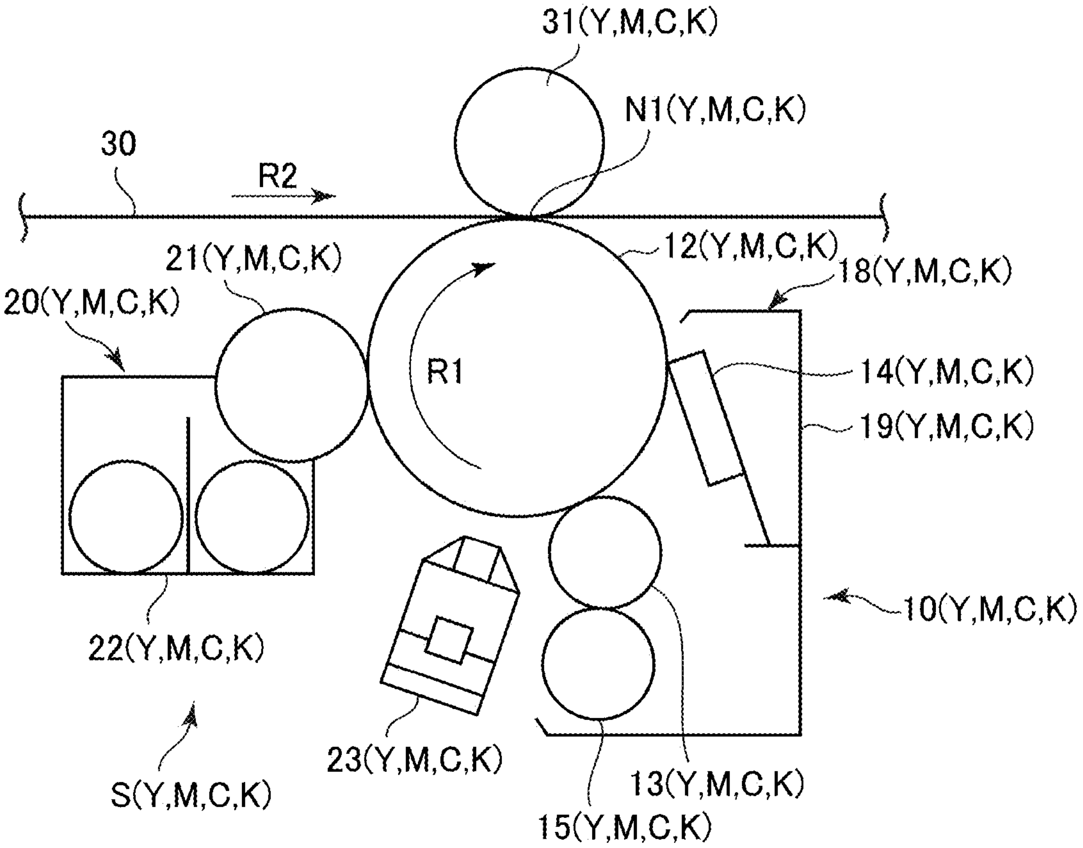
FIG. 2 is a schematic sectional view of an image forming portion.

The image forming apparatus 1 includes, as a plurality of image forming portions (stations), four image forming portions SY, SM, SC, and SK for forming images of yellow (Y), magenta (M), cyan (C), and black (K), respectively. Constitutions and operations of these image forming portions SY, SM, SC, and SK are substantially the same except for the colors of toner used. Incidentally, as regards elements provided for the respective colors and having the same or corresponding functions or constitution, suffixes Y, M, C, and K of reference numerals or symbols showing the elements each for an associated one of the colors are omitted and are collectively described in some instances. FIG. 2 is a schematic sectional view showing a single image forming portion S as a representative. In this embodiment, the image forming portion S includes the photosensitive drum 12 (12Y, 12M, 12C, 12K), a charging roller 13 (13Y, 13M, 13C, 13K), an exposure device 23 (23Y, 23M, 23C, 23K), a developing device 20 (20Y, 20M, 20C, 20K), a cleaning device 18 (18Y, 18M, 18C, 18K), a cleaning roller 15 (15Y, 15M, 15C, 15K), and the like.

In the image forming portion S, the photosensitive drum 12 which is a rotatable drum-shaped (cylindrical) photosensitive member (electrophotographic photosensitive member) as a first image bearing member is provided. The photosensitive drum 12 is rotationally driven in an arrow R1 direction (clockwise direction) in FIG. 2 by transmitting a driving force thereto from a drum driving portion as an unshown driving means. A surface of the rotating photosensitive drum 12 is electrically charged uniformly to a predetermined polarity (negative polarity in this embodiment) and a predetermined potential by the charging roller 13 which is a roller-shaped charging member as a charging means. The charging roller 13 is provided in contact with the surface of the photosensitive drum 12, and is rotated with rotation of the photosensitive drum 12. During the charging, to the charging roller 13, by a charging power source (high-voltage power source) as an unshown voltage applying portion, a predetermined charging voltage (charging bias) is applied. By this, electric discharge is generated between the charging roller 13 and the photosensitive drum 12, so that the surface of the photosensitive drum 12 is charged.

The charged surface of the photosensitive drum 12 is exposed to light by the exposure device 23 as an exposure means (electrostatic image forming means), so that an electrostatic image (electrostatic latent image) is formed on the photosensitive drum 12. In this embodiment, the exposure device 23 irradiates the surface of the photosensitive drum 12 with light emitted from an LED as a light source depending on the image signal. Incidentally, the exposure device 23 may be a laser scanner device or the like, and may also be constituted as a single unit for exposing, for example, four photosensitive drums 12.

The electrostatic image formed on the photosensitive drum 12 is developed (visualized by being supplied with toner by the developing device 20 as a developing means, so that a toner image (toner picture, developer image) is formed on the photosensitive drum 12. In this embodiment, the developing device 20 uses a two-component developer including toner (non-magnetic toner particles) as the developer and a carrier (magnetic carrier particles). The developing device 20 includes a developing sleeve 21 as a developer carrying member and a developing container 22 accommodating the developer. The developing sleeve 21 carries the developer in the developing container 22 and conveys the developer to a developing position which is an opposing portion to the photosensitive drum 12. During the development, the developing sleeve 21 is rotationally driven by transmitting thereto the driving force from the drum driving portion, for example. Further, during the development, to the developing sleeve 21, a predetermined developing voltage (developing bias) is applied by a developing power source (high-voltage power source) as an unshown developing voltage applying portion. By this, the toner as the developer carried on the developing sleeve 21 is supplied to the surface of the photosensitive drum 12 depending on the electrostatic image, so that the toner image is formed on the photosensitive drum 12. In this embodiment, on an exposed (image portion) of the photosensitive drum 12 lowered in absolute value of a potential by being exposed to light after being charged uniformly, the toner charged to the same polarity (negative polarity in this embodiment) as a charge polarity of the photosensitive drum 1 is deposited (reverse development type). In this embodiment, a normal charge polarity of the toner, which is a principal charge polarity of the toner during the development is the negative polarity. To the developing device 20, from a toner cartridge 40 (40Y, 40M, 40C, 40K) as a developer supplying container, the toner is supplied via an unshown developer conveying portion (conveying path).

As a second image bearing member, an intermediary transfer belt 30 which is the intermediary transfer member constituted by a rotatable endless belt is provided so as to oppose the four photosensitive drums 12Y, 12M, 12C, and 12K. The intermediary transfer belt 30 is formed in an endless shape by a dielectric resin such as polyimide. The intermediary transfer belt 30 is extended around, as a plurality of stretching rollers (supporting rollers), a driving roller 32, a tension roller 33, an upstream auxiliary roller 34, and a pre-secondary transfer roller 35, and is stretched by a predetermined tension. The driving roller 32 is rotationally driven by transmitting thereto the driving force from a belt driving portion as an unshown driving means. To the intermediary transfer belt 30, the driving force is inputted from the driving roller 32, so that the intermediary transfer belt 30 is rotated (circulated and moved) in an arrow R2 direction (counterclockwise direction) in FIG. 1. The tension roller 33 imparts a predetermined tension to the intermediary transfer belt 30. The upstream auxiliary roller 34 is disposed upstream of a primary transfer portion N1 described later with respect to a rotational direction (surface movement direction, conveying direction) of the intermediary transfer belt 30, and forms an image transfer surface disposed substantially horizontally in cooperation with the pre-secondary transfer roller 35. The pre-secondary transfer roller 35 forms a surface of the intermediary transfer belt 30 in the neighborhood of a position upstream of a secondary transfer portion N2 described later with respect to the rotational direction of the intermediary transfer belt 30. The driving roller 32 also has a function of a secondary transfer opposite roller (inner secondary transfer roller) as an opposing member (opposite electrode) to the secondary transfer roller 36 described later. On an inner peripheral surface side of the intermediary transfer belt 30, correspondingly to the photosensitive drums 12Y, 12M, 12C, and 12K, primary transfer rollers 31Y, 31M, 31C, and 31K which are roller-shaped primary transfer members as primary transfer means are provided, respectively. The primary transfer roller 31 is pressed toward the photosensitive drum 12 and contacts the photosensitive drum 12 via the intermediary transfer belt 30, and forms a primary transfer portion (primary transfer nip) N1 (N1Y, N1M, N1C, N1K) which is a contact portion between the photosensitive drum 12 and the intermediary transfer belt 30. The stretching rollers other than the driving roller 32, and the primary transfer rollers 31 are rotated with rotation of the intermediary transfer belt 30.

The toner image formed on the photosensitive drum 12 is transferred (primary-transfer red) onto the intermediary transfer belt 30 rotating as a toner image receiving member by the action of the primary transfer roller 31 in the primary transfer portion N1. During the primary transfer, to the primary transfer roller 31, by a primary transfer power source (high-voltage power source) as an unshown primary transfer voltage applying portion, a primary transfer voltage (primary transfer bias) which is a DC voltage of an opposite polarity (positive polarity) to the normal charge polarity of the toner is applied. For example, during full-color image formation, toner images of the colors of yellow, magenta, cyan, and black formed on the photosensitive drums 12 are successively transferred superposedly onto the intermediary transfer belt 30.

On an outer peripheral surface side of the intermediary transfer belt 30, in a position opposing the driving roller 32, the secondary transfer roller (outer secondary transfer roller) 36 which is a roller-shaped secondary transfer member (rotatable transfer member) as a secondary transfer means is provided. The secondary transfer roller 36 is pressed toward the driving roller 32 and contacts the driving roller 32 via the intermediary transfer belt 30, and forms a secondary transfer portion (secondary transfer nip) N2 which is a contact portion between the intermediary transfer belt 30 and the secondary transfer roller 36. In this embodiment, the secondary transfer roller 36 is rotated with the rotation of the intermediary transfer belt 30. Incidentally, the secondary transfer roller 36 may also be constituted so as to be rotationally driven.

The toner image formed on the intermediary transfer belt 30 is transferred (secondary-transfer red) onto the recording material P as the toner image receiving member nipped and conveyed by the intermediary transfer belt 30 and the secondary transfer roller 36 by the action of the secondary transfer roller 36 in the secondary transfer portion N2. During the secondary transfer, to the secondary transfer roller 36, by a secondary transfer power source (high-voltage power source) as an unshown secondary transfer voltage applying portion, a secondary transfer voltage (secondary transfer bias) which is a DC voltage of an opposite polarity (positive polarity) to the normal charge polarity of the toner is applied. The driving roller (secondary transfer opposite roller) 32 is electrically grounded (connected to the ground). Incidentally, a secondary transfer voltage of the same polarity as the normal charge polarity is applied to the inner roller corresponding to the driving roller 32 and the outer roller corresponding to the secondary transfer roller 36 in this embodiment may be electrically grounded. The recording materials P and accommodated in cassettes 50 each of a feeding portion (recording material accommodating portion). The recording materials P are fed one by one from an associated cassette 50 by a feeding roller pair 51 or the like as a feeding member, and is conveyed to a registration roller pair 60 as a recording material conveying member. This recording material P is aligned in attitude by the registration roller pair 60, and thereafter, is conveyed toward the secondary transfer portion N2 at a predetermined timing to the toner image on the intermediary transfer belt 30.

The recording material P on which the toner image is transferred is conveyed to a fixing device 70 as a fixing means. The fixing device 70 heats and presses the recording material P on which the unfixed toner image, and thus fixes (melts, sticks) the toner image on the surface of the recording material P. The recording material P on which the toner image is fixed is discharged (outputted) to a discharge tray 90 as a discharge portion provided outside an apparatus main assembly of the image forming apparatus 1 (hereinafter, simply referred to as the "apparatus main assembly") la by a discharging roller pair 80 as a discharging portion.

On the other hand, toner remaining on the photosensitive drum 12 after the primary transfer (primary transfer residual toner) is removed and collected from the surface of the photosensitive drum 12 by a cleaning device 18 as a cleaning means. The cleaning device 18 scrapes off the primary transfer residual toner from the surface of the rotating photosensitive drum 12 by a cleaning blade 14 as a cleaning member provided in contact with the surface of the photosensitive drum 12, and accommodates the primary transfer residual toner in a collected toner accommodating portion 19. Details of the cleaning device 18 will be described later. Further, on the outer peripheral surface side of the intermediary transfer belt 30, in a position opposing the tension roller 33 via the intermediary transfer belt 30, a belt cleaning device 37 as an intermediary transfer member cleaning means is provided. A deposited matter such as toner remaining on the intermediary transfer belt 30 after the secondary transfer (secondary transfer residual toner), paper powder deposited from the recording material P on the intermediary transfer belt 30 is removed and collected from the intermediary transfer belt 30 by the belt cleaning device 37. Further, the surface of the charging roller 13 is cleaned by a cleaning roller 15, which is a rotatable roller-shaped charging member cleaning member as a charging member cleaning means, provided in contact with the surface of the charging roller 13.

In this embodiment, in each image forming portion S, the photosensitive drum 12, the charging roller 13, the cleaning roller 15, and the cleaning device (cleaning unit) 18 integrally constitutes the drum cartridge 10 detachably mountable to the apparatus main assembly 1*a*. Further, in this embodiment, in each image forming portion S, the developing device (developing unit) 20 substantially singly constitutes a developing cartridge detachably mountable to the apparatus main assembly 1*a*.

In this embodiment, as an example of a sealing constitution for sealing the developer existing region, a sealing constitution of the drum cartridge 10 will be described. The drum cartridge 10 (or the cleaning device 18) in this embodiment is an example of the developer accommodating device including a developer accommodating portion at least temporarily accommodating the developer (including that the developer passes through the developer accommodating portion).

2. Drum Cartridge

Figure 3:
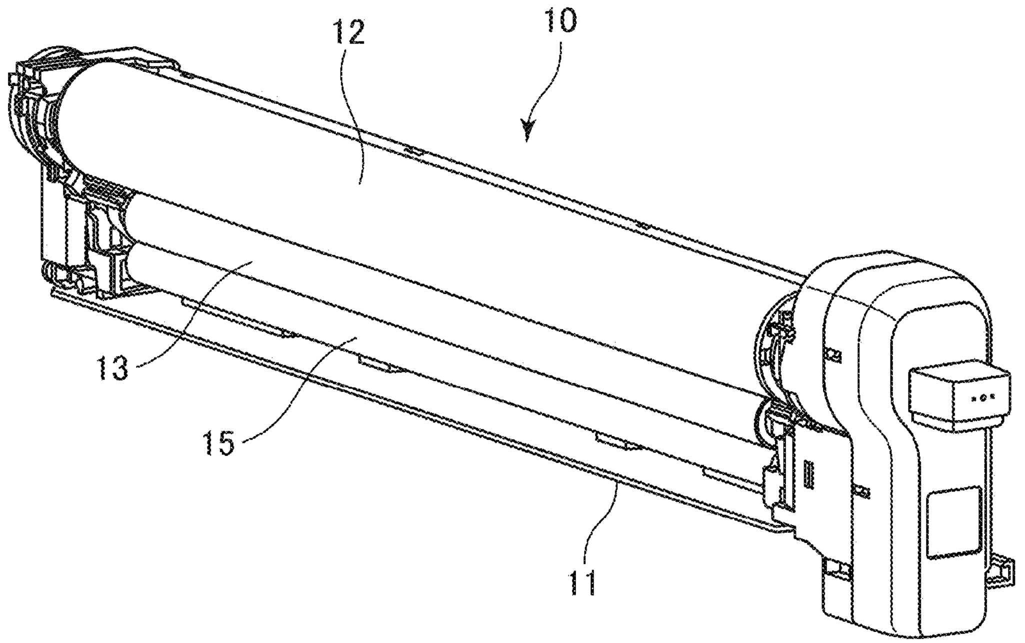
FIG. 3 is a perspective view of an outer appearance of a drum unit.
Figure 4:
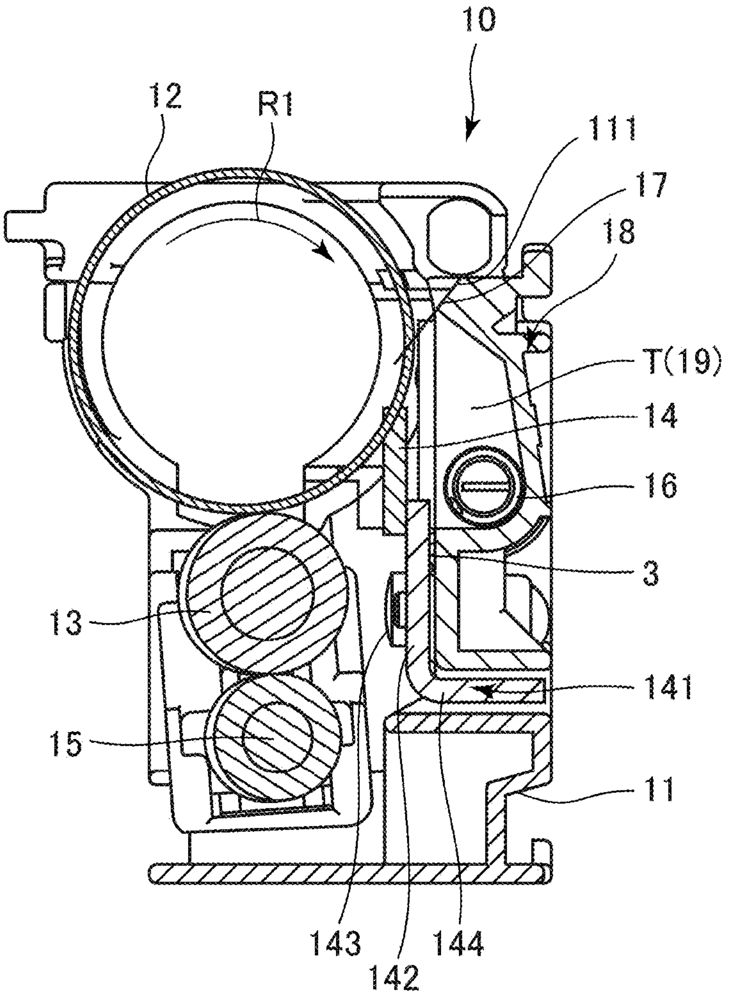
FIG. 4 is a sectional view of the drum unit.

Next, with reference to FIGS. 3 and 4, the drum cartridge 10 in this embodiment will be described. FIG. 3 is a perspective view of an outer appearance of the drum cartridge 10 in this embodiment. FIG. 4 is a sectional view (showing a cross section substantially perpendicular to the rotational axis direction of the photosensitive drum 12) of the drum cartridge 10 in this embodiment. In FIG. 3, the drum cartridge 10 is illustrated so that a rear side thereof is a left side of the drawing sheet, and a front side thereof is a right side of the drawing sheet. Further, in FIG. 4, a cross section of the drum cartridge 10 in a substantially central portion with respect to the rotational axis direction of the photosensitive drum 12 is shown.

The drum cartridge 10 is constituted so that the photosensitive drum 12, the charging roller 13, the cleaning blade 14, the cleaning roller 15, and the like are held by a drum cartridge container (drum cartridge frame) 11. The drum cartridge 10 is constituted so as to be detachably mountable to the apparatus main assembly 1*a* and is capable of being exchanged in maintenance or the like of the image forming apparatus 1. The drum cartridge 10 is exchanged with a new article, for example, in the case where the photosensitive drum 12 reaches an end of a lifetime thereof, or in the like case.

The drum cartridge container 11 is rotatably supported via bearings (not shown). The photosensitive drum 12 is rotationally driven by transmitting thereto the driving force from the drum driving portion provided in the apparatus main assembly 1*a*. The photosensitive drum 12 is rotated in the arrow R1 direction (clockwise direction) in FIG. 4.

Further, in the drum cartridge container 11, the charging roller 13 is rotatably supported via bearings (not shown). The charging roller 13 is pressed against the photosensitive drum 12 via the bearings thereof by pressing springs (not shown) which are urging members as urging means. The charging roller 13 is rotated with rotation of the photosensitive drum 12.

Further, in the drum cartridge container 11, the cleaning roller 15 is rotatably supported via bearings (not shown). The cleaning roller 15 is pressed against the charging roller 13 via the bearings thereof by pressing springs (not shown) which are urging members as urging means. The cleaning roller 15 is rotated with rotation of the charging roller 13.

Incidentally, rotational axis directions of the photosensitive drum 12, the charging roller 13, and the cleaning roller 15 are substantially parallel to each other.

Further, the drum cartridge 10 is, as described later specifically, provided with the cleaning device 18 constituted by the collected toner accommodating portion 19 and the like formed by the drum cartridge container 11.

3. Cleaning Device

Next, with reference to FIG. 4, the cleaning device 18 in this embodiment will be described.

The cleaning device 18 is constituted by the cleaning blade 14, a blade supporting member 141, the collected toner accommodating portion 19 formed by the drum cartridge container 11, a conveying coil 16, and the like.

The cleaning blade 14 is formed of a rubber such as urethane rubber which is an elastic member. The cleaning blade 14 is a plate-like (blade-shaped) member which has a predetermined length and a predetermined thickness in a longitudinal direction substantially parallel to the rotational axis direction of the photosensitive drum 12 and a widthwise (short) direction substantially perpendicular to the longitudinal direction, respectively, and which has a rectangular shape in plan view. The length of the cleaning blade 14 is equivalent to a length of the photosensitive drum 12 in the rotational axis direction. For example, the length of the cleaning blade 14 in the longitudinal direction is shorter than the length of the photosensitive drum 12 in the rotational axis direction (i.e., a length range of the cleaning blade 14 falls within a length range of the photosensitive drum 12). The length of the cleaning blade 14 in the longitudinal direction is longer than at least an image forming region (toner image formable region) on the photosensitive drum 12 in the rotational axis direction of the photosensitive drum 12 (i.e., a length range of the image forming region falls within the length range of the cleaning blade 14).

The cleaning blade 14 is fixed to the blade supporting member 141 at a lower end portion surface thereof with respect to the widthwise (short) direction on a side opposite from the photosensitive drum 12. In addition, this blade supporting member 141 is mounted to the drum cartridge container 11, so that the cleaning blade 14 is fixed to the drum cartridge container 11.

The blade supporting member 141 is formed of a plate-like member (metal plate) constituted by metal (SUS (stainless steel) in this embodiment). The blade supporting member 141 includes a blade fixing portion 142 which is a flat plate-like portion extending along the rotational axis direction of the photosensitive drum 12.

The blade supporting member 141 is mounted to the drum cartridge container 11 by being fixed, at the blade fixing portion 142 thereof, to the drum cartridge container 11 with screws 143 as a fixing means. Further, the cleaning blade 14 is fixed to a surface of the blade fixing portion 142 of the blade supporting member 141 on a photosensitive drum 12 side by bonding as a fixing means. A length of the blade fixing portion 142 of the blade supporting member 141 in the longitudinal direction is longer than a length of the cleaning blade 14 in the longitudinal direction (i.e., a length range of the cleaning blade 14 falls within a length range of the blade supporting member 141). Incidentally, in this embodiment, the blade supporting member 141 is constituted by including the above-described blade fixing portion 142 and a projected portion 144 formed by bending a metal plate so as to have a substantially L-shape in cross section in a direction substantially parallel to the blade fixing portion 142.

The cleaning blade 14 is pressed against the surface of the photosensitive drum 12 so that an edge of an upper end portion thereof with respect to the widthwise direction is aligned in the rotational axis direction.

The cleaning blade 14 is disposed so that a free end portion thereof which is the upper end portion thereof with respect to the widthwise direction is positioned on a side upstream of a fixed end portion which is a lower end portion with respect to the rotational direction of the photosensitive drum 12, and is contacted to the surface of the photosensitive drum 12. That is, the cleaning blade 14 is contacted to the surface of the photosensitive drum 12 in a counter direction to the rotational direction of the photosensitive drum 12.

The cleaning blade 14 removes the primary transfer residual toner by scraping off the primary transfer residual toner from the surface of the rotating photosensitive drum 12, and accommodates the primary transfer residual toner in the collected toner accommodating portion 19 formed by the drum cartridge container 11. In the neighborhood of the cleaning blade 14 in the collected toner accommodating portion 19 (in the neighborhood of a bottom of the collected toner accommodating portion 19), the conveying coil 16 as a conveying member is disposed along the rotational axis direction of the photosensitive drum 12 (along the longitudinal direction of the cleaning blade 14). The conveying coil 16 is rotationally driven by transmitting a driving force thereto from the belt driving portion as a driving means provided in the apparatus main assembly 1*a*, for example. The toner (collected toner) accommodated in the collected toner accommodating portion 19 is conveyed toward, for example, a rear side along the rotational axis direction of the photosensitive drum 12 by the conveying coil 16 provided in the collected toner accommodating portion 19. Then, the toner conveyed by the conveying coil 16 passes through a discharge opening (not shown) provided in the drum cartridge container 11, and is discharged to an outside of the drum cartridge 10 (drum cartridge container 11). The toner discharged from the drum cartridge 10 passes through an unshown conveying portion (conveying path) provided in the apparatus main assembly 1*a*, and thus is conveyed toward a collected toner box (not shown) as a developer collecting container (collecting portion) provided in the apparatus main assembly 1*a*.

Thus, the cleaning device 18 is constituted so that the collected toner removed from the photosensitive drum 12 by the cleaning blade 14 is at least temporarily stagnated in the collected toner accommodating portion 19.

4. Outline of Sealing Constitution

Next, with reference to FIGS. 4, 5, and 6, the sealing constitution of the drum cartridge 10 in this embodiment will be described. Part (a) of FIG. 5 and part (a) of FIG. 6 are perspective views of the drum cartridge 10 for illustrating the sealing constitution of the drum cartridge 10 as viewed from the photosensitive drum 12 side. In part (a) of FIG. 5 and part (a) of FIG. 6, the photosensitive drum 12, the charging roller 13, the cleaning roller 15, the cleaning blade 14, and the blade supporting member 141 are omitted from illustration. Further, part (b) of FIG. 5 and part (b) of FIG. 6 are front views of the drum cartridge 10 for illustrating the sealing constitution of the drum cartridge 10 as viewed from the photosensitive drum 12 side. In part (b) of FIG. 5 and part (b) of FIG. 6, the photosensitive drum 12, the charging roller 13, and the cleaning roller 15 are omitted from illustration. FIGS. 5 and 6 show states different in bonding position of side seals described later. Further, in FIGS. 5 and 6, for convenience of explanation, a side seal 2 having a conventional shape is shown. A side seal 4 having a shape according to the present invention in this embodiment will be described later with reference to FIGS. 8 and 9.

Incidentally, in this embodiment, the sealing constitution of the drum cartridge 10 is substantially symmetrical with respect to a plane which passes through a center of the photosensitive drum 2 with respect to the rotational axis direction and which is substantially parallel to the rotational axis direction of the photosensitive drum 12. Accordingly, description will be made by paying attention to a constitution on one (rear) end portion side with respect to the rotational axis direction of the photosensitive drum 12.

In this embodiment, a region (herein, also referred to as a "toner region") T, in which the toner exists, which is the collected toner accommodating portion 19 in which the toner scraped off from the photosensitive drum 12 by the cleaning blade 14 is sealed by the following sealing constitution.

First, a scattering prevention sheet 17 is fixed to a wall surface 111 (FIG. 4) of the drum cartridge container 11 which constitutes an upper edge portion of the collected toner accommodating portion 19 and which opposes the photosensitive drum 12. The scattering prevention sheet 17 is provided over a substantially entire region (region longer than a length of the cleaning blade 14 in the longitudinal direction) of the photosensitive drum 12 with respect to the rotational axis direction. The scattering prevention sheet 17 is formed of a flexible resin such as PET (polyethyleneterephthalate). The scattering prevention sheet 17 is a sheet-like (thin plate-shaped) member which has a predetermined length and a predetermined thickness in the longitudinal direction disposed substantially parallel to the rotational axis direction of the photosensitive drum 1 and in the widthwise direction substantially perpendicular to the longitudinal direction, respectively, and which has a rectangular shape in plan view. The scattering prevention sheet 17 is fixed to the wall surface 111 of the drum cartridge container 11 at a surface of an upper end portion with respect to the widthwise direction on a side opposite from the photosensitive drum 12. In this embodiment, the scattering preventing sheet 17 is fixed to the wall surface 111 of the drum cartridge container 11 by a double-side tape as a fixing means. Further, the scattering preventing sheet 17 is contacted to the surface of the photosensitive drum 12 in a part of a region of a lower end portion with respect to the widthwise direction. The scattering prevention sheet 17 is contacted to the surface of the photosensitive drum 12 by being disposed so that a free end portion which is a lower end portion with respect to the widthwise direction is positioned downstream of an upper end portion with respect to the rotational direction of the photosensitive drum 12. The scattering prevention sheet 17 seals a gap between the wall surface 111 of the drum cartridge container 11 and the photosensitive drum 12.

Further, to a wall surface 112 of the drum cartridge container 11 which constitutes a lower edge portion of the collected toner accommodating portion 19 and which opposes the photosensitive drum 12, a blade back seal 3 which is a sealing member is fixed. The blade back seal 3 is provided over a substantially entire region (region which is longer than a length of the cleaning blade 14 in the longitudinal direction and which is shorter than a length of a blade fixing portion 142 of the blade supporting member 141 in the longitudinal direction) of the photosensitive drum 12 with respect to the rotational axis direction. In this embodiment, the blade back seal 3 is formed of an urethane foam (sponge) which is an elastic foam member as an elastic member. The blade back seal 3 is a prism-like member which is provided along (in this embodiment, substantially parallel to) the rotational axis direction of the photosensitive drum 12 and which has a substantially rectangular shape (substantially square shape) in cross section substantially perpendicular to the longitudinal direction. An upper end portion of the blade supporting member 141 with respect to the widthwise direction extends over a lower edge portion of the collected toner accommodating portion 19. Further, the blade back seal 3 is disposed so as to be nipped between the blade supporting member 141 and the wall surface 112 of the drum cartridge container 11. The blade back seal 3 is fixed to the wall surface 112 of the drum cartridge container 11 at a surface thereof on a side opposite from the blade supporting member 141. In this embodiment, the blade back seal 3 is fixed to the wall surface 112 of the drum cartridge container 11 by the double side tape as the fixing means. A surface of the blade back seal 3 on a side opposite from the drum cartridge container 11 contacts a surface of the blade fixing portion 142 in the blade supporting member 141 on a side opposite from the photosensitive drum 12. The blade back seal 3 seals a gap between the wall surface 112 of the drum cartridge container 11 and the blade supporting member 141.

Further, the side seal 2 which is a seal (sealing) member is fixed to a wall surface 113 of the drum cartridge container 11 which constitutes an edge portion of an end portion of the collected toner accommodating portion 19 with respect to the rotational axis direction of the photosensitive drum 12 and which opposes the photosensitive drum 12. The side seal 2 is provided over a region which overlaps with the scattering prevention sheet 17 at an upper end portion thereof along a direction crossing (in this embodiment, substantially perpendicular to) the rotational axis direction of the photosensitive drum 12 and which overlaps with the blade back seal 3 at a lower end portion thereof along the direction. In this embodiment, the side seal 2 is formed of an urethane foam (sponge) which is an elastic foam member as an elastic member. The side seal 2 is a prism-like member which is disposed so as to cross (in this embodiment, substantially perpendicular to) the rotational axis direction of the photosensitive drum 12 and which has a substantially rectangular shape (substantially oblong shape longer in side along the rotational axis direction of the photosensitive drum 12) in cross section substantially perpendicular to the longitudinal direction. The side seal 2 is disposed so that at least a part of an upper end portion thereof is nipped between the scattering prevention sheet 17 and the wall surface 113 of the drum cartridge container 11. Further, the side seal 2 is disposed so that at least a part of a lower end portion thereof is nipped between the blade supporting member 141 and the blade back seal 3 and so that at least another part thereof is nipped between the blade supporting member 141 and the wall surface 113 of the drum cartridge container 11. In addition, the side seal 2 is fixed to the wall surface 113 of the drum cartridge container 11 at a surface thereof on a side opposite from the photosensitive drum 12. In this embodiment, the side seal 2 is fixed to the wall surface 113 of the drum cartridge container 11 by a double-side tape as a fixing means.

At least a part of the upper end portion of the side seal 2 on the photosensitive drum 12 side contacts a surface of the scattering prevention sheet 17 on the side opposite from the photosensitive drum 12. Further, in the lower end portion of the side seal 2, at least a part of the surface of the side seal 2 on the side opposite from the photosensitive drum 12 contacts the blade back seal 3. Further, in the lower end portion of the side seal 2, at least a part of the surface of the side seal 2 on the photosensitive drum 12 side contacts the surface of the blade fixing portion 142 in the blade supporting member 141 on the side opposite from the photosensitive drum 12. Further, a central region (region between a region overlapping with the scattering prevention sheet 17 and a region overlapping with the blade supporting member 141) of the side seal 2 with respect to an up-down direction contacts a surface of an end portion of the photosensitive drum 12 or the cleaning blade 14 with respect to the longitudinal direction on the side opposite from the photosensitive drum 12. The side seal 2 seals gaps between the wall surface 113 of the drum cartridge container 11 and the blade supporting member 141, between the wall surface 113 of the drum cartridge container 11 and the scattering prevention sheet 17, embodiment the wall surface 113 of the drum cartridge container 11 and the end portion of the cleaning blade 4 with respect to the longitudinal direction, and between the wall surface 113 of the drum cartridge container 11 and the photosensitive drum 12.

Here, each of the blade back seal 3 and the side seal 2 fills the gap between the associated members by being compressed and deformed between the members in the region nipped between the members as described above, and thus suppresses that the toner flows out to an outside through the gap.

Further, as described above, to the surface of the photosensitive drum 12, the cleaning blade 14 fixed to the blade supporting member 141 is contacted.

By this, a toner region T (collected toner accommodating portion 19) is sealed by being enclosed by the scattering prevention sheet 17, the blade back seal 3, the side seal 2, the blade supporting member 141, and the cleaning blade 14. In other words, a region enclosed by the scattering prevention sheet 17, the blade back seal 3, the side seal 2, the blade supporting member 141, and the cleaning blade 4 is the toner region T (collected toner accommodating portion 19).

5. Sealing Constitution of End Portion of Toner Region

Next, a sealing constitution of an end portion of the toner region T (collected toner accommodating portion 19) in the rotational axis direction of the photosensitive drum 12 will be further described.

Here, the longitudinal direction of the side seal 2 (widthwise direction of the toner region T) disposed along the direction crossing (in this embodiment, substantially perpendicular to) the rotational axis direction of the photosensitive drum 12 is referred to as an "X direction (first direction)". Further, a longitudinal direction of the blade back seal 3 disposed along (in this embodiment, substantially parallel to) the rotational axis direction of the photosensitive drum 12 is referred to as a "Y direction (second direction)". In this embodiment, the X direction and the Y direction are substantially perpendicular to each other. Further, in this embodiment, the X direction is substantially parallel to a gravitational direction. Incidentally, each of part (b) of FIG. 5 and part (b) of FIG. 6 is a front view of the drum cartridge 10 as viewed from the photosensitive drum 12 side along a direction substantially perpendicular to each of the X direction and the Y direction. As described above, in FIGS. 5 and 6, the side seal 2 having the conventional shape is shown.

As shown in part (a) of FIG. 5, the side seal 2 is fixed to the wall surface 113 of the drum cartridge container 11 adjacently to an end portion of the toner region T with respect to the Y direction. As shown in part (b9 of FIG. 5, a lower end portion 420 of the side seal 2 with respect to the X direction is disposed on a back side of the blade supporting member 141, and fills a gap between the drum cartridge container (first member) 11 and the blade supporting member (second member) 141.

Incidentally, it would be considered that a constitution in which an integral seal member including a portion corresponding to the side seal 2 and a portion corresponding to the blade back seal 3 is used is employed. However, in the case where such a constitution is employed, for example, waste is liable to occur in material taking of the seal member and leads to an increase in cost in some instances. For that reason, as in this embodiment, the side seal 2 and the blade back seal 3 may preferably be constituted by separate seal members.

Further, as shown by a hatched portion in part (b) of FIG. 5, the side seal 2 is stuck to the drum cartridge container 11 so that the lower end portion 420 thereof with respect to the X direction and the blade back seal 3 are superposed on each other. This is for preventing generation of a gap between the side seal 2 and the blade back seal 3 due to a sticking error and variation in parts of the seal members themselves when the seal members are stuck to the drum cartridge container 11. In this embodiment, the side seal 2 is stuck superposedly on the blade back seal 3 so that the side seal 2 is positioned on the blade supporting member 141 side than the blade back seal 3.

In the case where the side seal 2 having the conventional shape is used, as shown in parts (a) and (b) of FIG. 5, setting is made so that the side seal 2 and the blade back seal 3 are superposed on each other.

However, for example, in the case where an operator for assembling a product sticks the seal member to a fixing object, a sticking variation of about 1 mm from a sticking reference occurs in some instance. For example, a variation in relative distance between the side seal 2 and the blade back seal 3 in the X direction includes variations with respect to an "approaching direction" which is a direction in which these seal members approach each other and a "separating direction" which is a direction in which these seal members are separated from each other. As described above, in the case where each of the seal members causes the sticking variation of about 1 mm, in some instances, there are errors with respect to the "approaching direction" and the "separating direction". Then, in an "approaching state" in which the variation in relative distance between the side seal 2 and the blade back seal 3 in the "approaching direction" occurs, there is a possibility that the following state is formed. That is, as shown in parts (a) and (b) of FIG. 6, there is a possibility that in the X direction, a lower end of the side seal 2 is positioned below a lower end of the blade back seal 3. That is, there is a possibility that the side seal 2 is stuck so as to cross the blade back seal 3.

This state will be further described. Part (a) of FIG. 7 is an enlarged view of the neighborhood of the side seal 2 in a state in which the side seal 2 shown in part (b) of FIG. 6 is stuck to the blade back seal 3 in a crossing manner, as viewed in the same direction as in part (b) of FIG. 6. Further, part (b) of FIG. 7 is a sectional view taken along an A-A line of part (a) of FIG. 7. Herein, an end portion (lower end portion 420 in this embodiment) of the side seal 2 superposed on the blade back seal 3 in the X direction is also referred to as a "superposed end portion".

As shown in part (b) of FIG. 7, a distance of the gap between the drum cartridge container 11 and the blade supporting member 141 is constant. On the other hand, in a region (hatched portion in parts (a) and (b) of FIG. 7) in which the side seal 2 and the blade back seal 3 are superposed on each other, there is a need to compress the seal members having a width thicker than in a region in which only the blade back seal 3 is crushed. In general, as the seal member used for preventing flow-out of the toner, an elastic member having elasticity to some extent, such as urethane foam (sponge), soft rubber, elastomer, or the like is used. In this embodiment, as the side seal 2 and the blade back seal 3, the urethane foam (sponge) is used, and in the region in which the side seal 2 and the blade back seal 3 are superposed on each other, the blade back seal 3 is crushed by the side seal 2. For that reason, between the region in which the side seal 2 and the blade back seal 3 are superposed and a region in which the side seal 2 and the blade back seal are not superposed, the blade back seal 3 cannot sufficiently follow the blade supporting member 141, so that a gap portion B (cross-hatched portion in parts (a) and (b) of FIG. 7) is formed. This gap portion B directly connects a toner region T and an outside region thereof in the X direction, and therefore the toner passed through the gap portion B flows to the outside of the toner region T. Particularly, in this embodiment, the X direction and the gravitational direction are substantially parallel to each other, and therefore, the toner is liable to flow out through the gap portion B.

Incidentally, in a "separated state" in which a variation in relative distance between the side seal 2 and the blade back seal 3 in the above-described "separating direction" is generated, as shown in parts (a) and (b) of FIG. 5, the lower end of the side seal 2 is positioned on the blade back seal in the X direction. In this case, a toner sealing portion 301 described later is formed, and therefore, the flow-out of the toner is suppressed.

6. Shape of Side Seal in this Embodiment

Next, a constitution of a side seal 4 in this embodiment for suppressing the flow-out of the toner from the above-described toner region T to the outside will be described.

FIG. 8 is a front view of the side seal 4 in this embodiment as viewed from the photosensitive drum 12 side along a direction substantially perpendicular to the X direction and the Y direction. Parts (a) and (b) of FIG. 9 are front views each showing a drum cartridge 10 to which the side seal 4 in this embodiment is mounted, as viewed from the photosensitive drum 12 side along the direction substantially perpendicular to the X direction and the Y direction. In parts (a) and (b) of FIG. 9, the photosensitive drum 12, the charging roller 13, the cleaning roller 15, the cleaning blade 14, and the blade supporting member 141 are omitted from illustration. Further, part (a) of FIG. 9 shows the above-described "separated state", and part (b) of FIG. 9 shows the above-described "approaching state".

In this embodiment, the side seal 4 has a shape as shown in FIG. 8. In the case where the side seal 4 is viewed from the direction substantially perpendicular to the X direction and the Y direction, the superposed end portion 420 which is one end portion with respect to the X direction includes (a) a first ridge line 401 contacting the toner region T and extending along the X direction, (b) a second ridge line 402 connected to the first ridge line 401 and extending in a direction crossing the first ridge line 401 so as to be spaced from the toner region T in a direction substantially perpendicular to the X direction, (c) a third ridge line 403 connected to the second ridge line 402 and extending along the X direction, and (d) a fourth ridge line 404 connected to the third ridge line 403 and extending in a direction crossing the third ridge line 403 so as to be spaced from the toner region T in the direction substantially perpendicular to the X direction. Incidentally, in the X direction, the fourth ridge line 404 is positioned on an end side of the superposed end portion 420 than the second ridge line 402.

In this embodiment, the first ridge line 401 and the third ridge line 403 extend substantially parallel to the X direction. Further, in this embodiment, the second ridge line 402 and the fourth ridge line 404 extend in a direction substantially perpendicular to the X direction. That is, in this embodiment, each of a corner (corner portion 407) formed by the first ridge line 401 and the second ridge line 402, a corner (corner portion) 408 formed by the second ridge line 402 and the third ridge line 403, and a corner (corner portion) 409 formed by the third ridge line 403 and the fourth ridge line 404 has a substantially right-angled shape.

With reference to parts (a) and (b) of FIG. 9, sealing of the toner region T by the side seal 4 and the blade back seal 3 in the "separated state" and the "approaching state" in the case where the side seal 4 in this embodiment is used will be described.

As shown in part (a) of FIG. 9, in the "separated state", in the X direction, the lower end of the side seal 4 is positioned on the blade back seal 3. In this case, the gap portion B (cross-hatched portion in part (a) of FIG. 9) is formed for the above-described reason, but the third ridge line 403 and the fourth ridge line 404 of the side seal 4 exist on the blade back seal 3. By this, the blade back seal 3 forms the toner sealing portion 301 by closely contacting the blade supporting member 141 in at least a part of a region opposing the fourth ridge line 404 in the X direction. For that reason, the toner which enters from the toner region T into the gap portion B formed by the third ridge line 403 and which moves in the X direction is blocked by this toner sealing portion 301.

As shown in part (b) of FIG. 9, in the "approaching state", in the X direction, the lower end of the side seal 4 is positioned below the lower end of the blade back seal 3. Also in this case, the gap portion B (cross-hatched portion in part (a) of FIG. 9) is formed for the above-described reason, but the first ridge line 401 and the second ridge line 402 of the side seal 4 exist on the blade back seal 3. By this, the blade back seal 3 forms the toner sealing portion 301 by closely contacting the blade supporting member 141 in at least a part of a region opposing the second ridge line 402 in the X direction. For that reason, the toner which enters from the toner region T into the gap portion B formed by the first ridge line 401 and which moves toward the fourth ridge line 404 is blocked by this toner sealing portion 301.

Incidentally, in the state of part (b) of FIG. 9, the third ridge line 403 crosses the lower end of the blade back seal 3, so that when the gap portion B is formed by the third ridge line 403, it would be considered that the toner passes through the gap portion B and flows to an outside. However, according to the side seal 4 in this embodiment, by the following action, the flow-out of the toner from the toner region T to the outside is suppressed. Part (a) of FIG. 10 is a schematic view showing a behavior of the toner in the "approaching state" in the case where the side seal 2 having the conventional shape is used. In this case, as shown by an arrow A1, the toner passes through the gap portion B directly connecting the toner region T and the outside thereof linearly and then flows to the outside from the toner region T.

On the other hand, part (b) of FIG. 10 is a schematic view showing a behavior of the toner in the "approaching state" in the case where the side seal 4 having the shape in this embodiment is used. In this case, as shown by an arrow A2, the toner entering from the toner region T to the gap portion B formed by the first ridge line 401 is bent in traveling direction to a direction along the second ridge line 402 by the action of the toner sealing portion 301 formed as described above. Thus, by bending the traveling direction of the toner, the toner does not readily move, so that even when the gap portion B is formed by the third ridge line 403, the flow-out of the toner passed through this gap portion B does not readily occur. Particularly, in this embodiment, the X direction is substantially parallel to the gravitational direction, and therefore, in the case where the side seal 2 having the conventional shape is used as shown in part (a) of FIG. 10, by the action of gravitation, the toner is slidable to flow out to the outside from the toner region T. On the other hand, in the case where the side seal 4 having the shape in this embodiment is used as shown in part (b) of FIG. 10, the traveling direction of the toner is bent in a direction crossing (in this embodiment, substantially perpendicular to) the gravitational direction. For that reason, even when the toner is liable to move downward by the action of gravitation, the traveling (movement) of the toner can be suppressed.

Here, in the case where the side seal 4 and the blade back seal 3 are viewed in the direction substantially perpendicular to the X direction and the Y direction, in a direction (in this embodiment, X direction) substantially perpendicular to the Y direction, a distance D between the second ridge line (seal ridge line) 402 and the fourth ridge line (seal ridge line) 404 is set smaller than a width W of the blade back seal 3.

Specifically, in the direction (in this embodiment, X direction) substantially perpendicular to the Y direction, a distance D between a position of the second ridge line 402 (in this embodiment, substantially whole fourth ridge line 402) on an endmost side of the superposed end portion 420 in the X direction and a position of the fourth ridge line 404 (in this embodiment, substantially whole fourth ridge line 404) on an endmost side of the superposed end portion 420 in the X direction is set smaller than a width W of the blade back seal 3 in a region in which the side seal 4 is superposed on the blade back seal 3. By this, in either one of the "approaching state" and the "separated state", in the case where the superposed end portion 420 of the side seal 4 is viewed from the direction substantially perpendicular to the X direction and the Y direction, at least a part (in this embodiment, substantially whole ridge line) of at least one ridge line of the second ridge line 402 and the fourth ridge line 404 is nipped between the blade back seal 3 and the blade supporting member 141 in a state in which the part is positioned on the blade back seal 3. Even in a state between the "approaching state" and the "separated state", by setting the distance D so as to be smaller than the width W as described above, the toner sealing portion 301 is formed by at least one region of the second ridge line 402 and the fourth ridge line 404. By this, in any state from the "approaching state" to the "separated state", the flow-out of the toner from the toner region T to the outside thereof can be suppressed.

Incidentally, the side seal 4 is not limited to that the shape of the corners 407, 408, and 409 is the substantially right-angle shape but may has a ridge line in a direction different from those in this embodiment. The toner sealing portion 301 may only be required to be capable of being formed so that the toner traveling direction is bent in a direction different from the direction of the gap portion B which is formed by at least the first ridge line 401 or third ridge line 403 and which is substantially parallel to the first ridge line 401 or the third ridge line 403. By this, it becomes possible to suppress the flow-out of the toner from the toner region T to the outside. Some modified embodiments will be described with reference to FIGS. 11 to 14. FIGS. 11 to 14 are front views each showing a side seal 4 in an associated modified embodiment viewed along the direction substantially perpendicular to the X direction and the Y direction.

For example, as shown in part (a) of FIG. 11, at least one of the second ridge line 402 and the fourth ridge line 404 may be inclined so as to be positioned on a side opposite from an end of the superposed end portion 420 in the X direction with a distance from the toner region T in a direction substantially perpendicular to the X direction. That is, for example, in the case where the X direction is disposed so as to be along (in this embodiment, substantially parallel to) the gravitational direction and the superposed end portion 420 of the side seal 4 is the lower end portion in the gravitational direction, at least one of the second ridge line 402 and the fourth ridge line 404 may be inclined so as to be positioned in an upper position in the gravitational direction with the distance from the toner region T in the direction substantially perpendicular to the X direction. By this, the toner sealing portion 301 is formed so as to be positioned in the upper position in the gravitational direction with the distance from the toner region T, and therefore, a sealing performance can be improved. However, for example, as shown in part (b) of FIG. 11, at least one of the second ridge line 402 and the fourth ridge line 404 may be inclined so as to be positioned on an end side of the superposed end portion 420 in the X direction with the distance from the toner region T in the direction substantially perpendicular to the X direction. For example, in the case where the X direction is disposed so as to cross the gravitational direction or in the like case, for example, at least one of the second ridge line 402 and the fourth ridge line 404 may be thus inclined correspondingly to an angle of the Y direction relative to the X direction. Further, as the directions of the second ridge line 402 and the fourth ridge line 404, the directions in this embodiment and the directions in the above-described modified embodiments can be used in arbitrary combinations.

Further, as shown in part (a) of FIG. 12, at least one of the corners 407, 408, and 409 of the side seal 4 may have an R shape (curved shape). The same applies to other corners of the side seal 4. Further, the same applies to side seals 4 having other shapes such as shapes shown in parts (a) and (b) of FIG. 11, in addition to the side seal 4 having the shape shown in FIG. 8.

Further, as shown in part (b) of FIG. 12, the third ridge line 403 may be inclined with respect to the X direction. Further, the shape of the third ridge line 403 is not limited to a linear shape. For example, as shown in parts (c) and (d) of FIG. 12, the shape of the third ridge line 403 may be a curved shape. In the side seal 4 shown in part (c) of FIG. 12, the third ridge line 403 has a curved shape projected inwardly, and in the side seal 4 shown in part (d) of FIG. 12, the third ridge line 403 has a curved shape projected outwardly.

Similarly, the shapes of the second ridge line 402 and the fourth ridge line 404 are not limited to the linear shape. For example, as shown in parts (a) and (b) of FIG. 13, at least one of the second ridge line 402 and the fourth ridge line 404 may have a curved shape. In the side seal 4 shown in part (a) of FIG. 13, the second ridge line 402 and the fourth ridge line 404 have a curved shape projected outwardly, and in the side seal 4 shown in part (a) of FIG. 13, the second ridge line 402 and the fourth ridge line 404 have a curved shape projected inwardly. Further, as the shapes of the second ridge line 402 and the fourth ridge line 404, the shapes in this embodiment and the shapes in the above-described modified embodiments can be used in arbitrary combinations.

Here, the "substantially parallel" not only means "completely parallel", but also includes the case of being deviated from "parallel" to a degree of an error (for example, about ±15 degrees). Similarly, the "substantially perpendicular" not only means "completely perpendicular", but also includes the case of being deviated from "perpendicular" to degree of an error (for example, about ±15 degrees). Further, the "direction along a predetermined direction" includes, in addition to the direction parallel to the predetermined direction, for example, a direction having an angle of less than 30 degrees (typically, less than 15 degrees) with respect to the predetermined direction. Further, the "direction crossing the predetermined direction" includes, in addition to the direction perpendicular to the predetermined direction, for example, a direction having an angle of 30 degrees or more (typically, 45 degrees or more).

In the side seal 4 shown in FIGS. 11 to 13, an effect similar to the above-described effect can be obtained by setting, in the direction substantially perpendicular to the Y direction, a distance D between a position of the second ridge line 402 on an endmost side of the superposed end portion 420 in the X direction and a position of the fourth ridge line 404 on an endmost side of the superposed end portion 420 in the X direction so as to be smaller than the width W of the blade back seal 3 in a region in which the side seal 4 is superposed on the blade back seal 3. Further, in other words, the effect similar to the above-described effect can be obtained by setting a distance D (part (a) of FIG. 11) in the X direction between the corner 407 formed by the first ridge line 401 and the second ridge line 402 and the corner 409 formed by the third ridge line 403 and the fourth ridge line 404 so as to be smaller than the width W of the blade back seal 3 in the gap in which the side seal 4 is superposed on the blade back seal 3.

Further, the side seal 4 is not limited to that the side seal 4 has two seal shapes consisting of the seal shape formed by the first ridge line 401 and the second ridge line 402 and the seal shape formed by the third ridge line 403 and the fourth ridge line 404. The side seal 4 may have three or more such seal shapes. For example, as shown in FIG. 14, in the case where the side seal 4 is viewed from the direction substantially perpendicular to the X direction and the Y direction, the superposed end portion 420 which is one end portion of the side seal 4 in the X direction includes (a) a first ridge line 401 contacting the toner region T and extending along the X direction, (b) a second ridge line 402 connected to the first ridge line 401 and extending in a direction crossing the first ridge line 401 so as to be spaced from the toner region T in the direction substantially perpendicular to the X direction, (c) a third ridge line 403 connected to the second ridge line 402 and extending along the X direction, (d) a fourth ridge line 404 connected to the third ridge line 403 and extending in a direction crossing the third ridge line 403 so as to be spaced from the toner region T in the direction substantially perpendicular to the X direction, (e) a fifth ridge line 405 connected to the fourth ridge line 404 and extending along the X direction, and a sixth ridge line 406 connected to the fifth ridge line 405 and extending in a direction crossing the fifth ridge line 405 so as to be spaced from the toner region T in the direction substantially perpendicular to the X direction. Incidentally, in the X direction, the fourth ridge line 404 is positioned on an end side of the superposed end portion 420 than the second ridge line 402, and the sixth ridge line 406 is positioned on an end side of the superposed end portion 420 than the fourth ridge line 404.

In the embodiment of FIG. 14, each of the first ridge line 401, the third ridge line 403, and the fifth ridge line 405 extends in a direction substantially parallel to the X direction. Further, in this embodiment, each of the second ridge line 402, the fourth ridge line 404, and the sixth ridge line 406 extends in a direction substantially perpendicular to the X direction. That is, in this embodiment, each of a corner 407 formed by the first ridge line 401 and the second ridge line 402, a corner 408 formed by the second ridge line 402 and the third ridge line 403, a corner 409 formed by the third ridge line 403 and the fourth ridge line 404, a corner 410 formed by the fourth ridge line 404 and the fifth ridge line 405, and a corner 411 formed by the fifth ridge line 405 and the sixth ridge line 406 has a substantially right-angle shape. The first to sixth ridge lines and the shapes of the corners may be arbitrarily changed similarly as those described with reference to FIGS. 11 to 13.

Also, in the side seal 4 shown in FIG. 14, an effect similar to the above-described effect can be obtained by setting the distance D smaller than the width W for each of the seal shapes. That is, in the case where the side seal 4 is viewed from the direction substantially perpendicular to the X direction and the Y direction, in the direction substantially perpendicular to the X direction and the Y direction, a distance D1 between the second ridge line (seal ridge line) 402 and the fourth ridge line (seal ridge line) 404 and a distance D2 between the fourth ridge line (seal ridge line) 404 and the sixth ridge line (seal ridge line) 406 may only be required to be set smaller than the width W of the blade back seal 3. By increasing the nip of seal-shaped portions, for example, even in the case where sticking errors of the side seal 4 and the blade back seal 3 are relatively large compared with the width of the blade back seal 3 or in the like case, irrespective of the sticking positions, the flow-out of the toner from the toner region T to the outside can be suppressed. However, the nip of seal-shaped portions can be said that ten or less (typically 5 or less) is sufficient in many instances.

Thus, in this embodiment, the developer accommodating device (cleaning device) 18 includes the first member (drum cartridge container) 11 and second member (blade supporting member) 141 which form the developer accommodating portion (collected toner accommodating portion) 19, the first sealing member (side seal) 4 extending in the first direction and sealing the developer accommodating portion 19, and the second sealing member (blade back seal) 3 extending in the second direction crossing the first direction and sealing the developer accommodating portion 19, and the first sealing member 4 is disposed so that at least a part of the superposed end portion 420 which is one end portion with respect to the first direction X is nipped between the first member 11 and the second member 141 in a state of being superposed on the second member 3. In the case where the superposed end portion 420 of the first sealing member 4 is viewed from the direction substantially perpendicular to the first direction X and the second direction Y, the superposed end portion 420 includes (a) the first ridge line 401 contacting the developer accommodating portion 19 and extending along the first direction X, (b) the second ridge line 402 connected to the first ridge line 401 and extending in the direction crossing the first ridge line 401 so as to be spaced from the developer accommodating portion 19 in the direction substantially perpendicular to the first direction X, (c) the third ridge line 403 connected to the second ridge line 402 and extending along the first direction X, and (d) the fourth ridge line 404 connected to the third ridge line 403 and extending in the direction crossing the third ridge line 403 so as to be spaced from the developer accommodating portion 19 in the direction substantially perpendicular to the first direction X. The fourth ridge line 404 is positioned on the end side of the superposed end portion 420 than the second ridge line 402 in the first direction X and in the case where the superposed end portion 420 is viewed from the direction substantially perpendicular to the first direction X and the second direction Y, in the direction substantially perpendicular to the second direction Y, the distance D between the position of the second ridge line 402 on the endmost side of the superposed end portion 420 and the position of the fourth ridge line 404 on the endmost side of the superposed end portion 420 is smaller than the width W of the second sealing member 3 in the region in which the first sealing member 4 is superposed on the second sealing member 3. In the case where the superposed end portion 420 of the first sealing member 4 is viewed from the direction substantially perpendicular to the first direction X and the second direction Y, at least a part of at least one ridge line of the second ridge line 402 and the fourth ridge line 404 is nipped between the second sealing member 3 and the second member 141 in a state of being superposed on the second sealing member 3. In this embodiment, by such a constitution, in the case where the second sealing member 3 is viewed from the direction substantially perpendicular to the first direction X and the second direction Y, the second sealing member closely contacts the second member 141 in at least a part of the region (toner sealing portion) 301 opposing the above-described at least one ridge line in the first direction X. In this embodiment, each of the second ridge line 402 and the fourth ridge line 404 extends in the direction substantially perpendicular to the first direction X. Further, in this embodiment, the developer accommodating device 18 is disposed so that the first direction X extends along the gravitational direction, and the superposed end portion 420 is the lower end portion with respect to the gravitational direction. For example, in this case, at least one of the second ridge line 402 and the fourth ridge line 404 may be inclined so as to be positioned in an upper position with respect to the gravitational direction with an increasing distance from the developer accommodating portion 19 in the direction substantially perpendicular to the first direction X. Further, in this embodiment, the first direction X and the second direction are substantially perpendicular to each other.

In other words, in the case where the superposed end portion 420 of the first sealing member 4 is viewed from the direction substantially perpendicular to the first direction X and the second direction Y, the superposed end portion 420 includes a plurality of seal ridge lines (second and fourth ridge lines 402 and 404 or second, fourth and sixth ridge lines 402, 404, and 406) which are ridge lines extending in the direction crossing the first direction X and which are connected from the ridge line 401 (first ridge line) which is a ridge line of the first sealing member 4 extending along the first direction X and which contacts the developer accommodating portion 19. In addition, the seal ridge lines are positioned on the end side of the superposed end portion 420 in the first direction X with an increasing distance from the developer accommodating portion 19 in the direction substantially perpendicular to the first direction X. In the case where the superposed end portion 420 is viewed from the direction substantially perpendicular to the first direction X and the second direction Y, in the direction substantially perpendicular to the second direction Y, the distance (D1, D2) between the positions of adjacent seal ridge lines each on the endmost side of the superposed end portion 420 is smaller than the width W of the second sealing member 3 in the region in which the first sealing member 4 is superposed on the second sealing member 3. In the case where the superposed end portion 420 of the first sealing member 4 is viewed from the direction substantially perpendicular to the first direction X and the second direction Y, at least a part of at least one seal ridge line is nipped between the second sealing member 3 and the second member 141 in a state of being superposed on the second sealing member 3. In this embodiment, by such a constitution, in the case where the second sealing member 3 is viewed from the direction substantially perpendicular to the first direction X and the second direction Y, the second sealing member closely contacts the second member 141 in at least a part of the region 301 opposing the above-described at least one seal ridge line in the first direction X. In this embodiment, each of the plurality of seal ridge lines extends in the direction substantially perpendicular to the first direction X. Further, for example, in the case where the developer accommodating device 18 is disposed so that the first direction X extends along the gravitational direction, and the superposed end portion 420 is the lower end portion with respect to the gravitational direction, at least one seal ridge line may be inclined so as to be positioned in an upper position with respect to the gravitational direction with an increasing distance from the developer accommodating portion 19 in the direction substantially perpendicular to the first direction X.

Further, in this embodiment, the developer accommodating device is the cleaning device 18 which includes the cleaning member (cleaning blade) 14 for removing the developer from the image bearing member (photosensitive drum) 12 for bearing the developer image, the container (drum cartridge container) 11 constituting the above-described first member, and the supporting member (blade supporting member) 141 for supporting the cleaning member 14 and constituting the above-described second member, and which accommodates, in the developer accommodating portion 19, the developer removed from the image bearing member 12 by the cleaning member 14. Further, according to this embodiment, the image forming apparatus 1 including the developer accommodating device 18 having the constitution as described above.

As described above, according to this embodiment, in a constitution in which in order to seal the region in which the developer exists, the corner of the region is sealed by at least two sealing members, reliability of the sealing performance can be enhanced. That is, according to this embodiment, in a constitution in which the plurality of sealing members are used for sealing the region in which the developer exists, the reliability of the sealing performance can be enhanced by suppressing the flow-out of the toner from the gap between the sealing members while more simplifying a manufacturing condition.

Embodiment 2

Next, another embodiment of the present invention will be described. In the embodiment 1, as an example of the sealing constitution for sealing the region in which the developer exists, the sealing condition of the drum cartridge 10 was described. In this embodiment, as another example of the sealing constitution, a sealing condition of a toner conveying portion (toner conveying path) in the image forming apparatus will be described.

Incidentally, general constitution and operation of the image forming apparatus are those in the embodiment 1. However, in the image forming apparatus of this embodiment, elements having the same or corresponding functions or constitutions of those of the image forming apparatus in the embodiment 1 will be omitted from detailed description by adding thereto the same reference numerals or symbols as those in the embodiment 1.

In the image forming apparatus 1, for example, the toner to be supplied to the developing device 20 is conveyed from the toner cartridge 40 to the developing device 20, or the toner discharged from the cleaning device 18 is conveyed to the collected toner box. Further, in the toner conveying portion therefor, the toner is conveyed over between the units or between the members by free fall or the conveying member. For that reason, also in the toner conveying portion, suppression of the flow-out of the toner is made by using the sealing member for filling the gap between the parts.

FIG. 15 is a perspective view of an outer appearance of a toner conveying portion 9 in this embodiment. FIG. 16 is a schematic sectional view of the toner conveying portion 9 in this embodiment. The toner conveying portion 9 in this embodiment constitutes, for example, a part of the toner conveying path from the toner cartridge 40 to the developing device 20. The toner conveying portion 9 in this embodiment is an example the developer accommodating device including the developer accommodating portion for at least temporarily accommodating the developer (including passing of the developer).

As shown in FIGS. 15 and 16, the toner conveying portion 9 includes a cap member 5 and a toner guiding portion 6. The cap member 5 in a plate-like member in which a rectangular opening 502 is formed, and includes a fixing portion 501 at a periphery of the opening 502. The toner guiding portion 6 includes a hollow pipe portion 602 rectangular in cross section and a rectangular flange portion 601 provided at one end portion of the hollow pipe portion 602 with respect to a longitudinal direction at the hollow pipe portion 602. Further, the toner is conveyed by the free fall through a space inside the opening 502 of the cap member 5 and the hollow pipe portion 602 of the toner guiding portion 6. In this embodiment, a region, in which the toner passes, which is the space inside the opening 502 of the cap member 5 and the hollow pipe portion 602 of the toner guiding portion 6 is the toner region T.

FIG. 17 is a schematic perspective view showing the sealing constitution of the toner conveying portion 9 (in which the cap member 5 is omitted from illustration). On a sticking portion 611 which is an upper surface of the flange portion 601 provided at the end portion of the toner guiding portion 6, a pair of lateral seals 7 which are sealing members and a pair of vertical seals 8 which are seal members are provided. In this embodiment, each of these sealing members is formed of an urethane foam (sponge) which is a foamed elastic member as an elastic member. Further, from a side opposing the sticking portion 611 of the toner guiding portion (first member) 6, the cap member (second member) is stuck through the sealing members, so that the sealing members are compressed and deformed by being nipped between the sticking portion 611 and the fixing portion 501. The cap member 5 is fixed to the toner guiding portion 6 by arbitrary fixing means (not shown). By this, the gap between the cap member 5 and the toner guiding portion 6 can be filled by the respective sealing members. Incidentally, the toner conveying portion 9 may have a constitution in which instead of the cap member 5, hollow pipe members 6 having the same constitution are connected to each other via the sealing members 7 and 8.

Thus, in the toner conveying portion 9, the toner region T is sealed by disposing the plurality of sealing members so as to enclose the toner region T. This is because when the integral sealing member is used for enclosing the toner region T similarly as described in the embodiment 1, the waste is liable to occur in material taking of the sealing member and thus leads to the increase in cost in some instances. In addition, also in the toner conveying portion 9 in this embodiment, in the case where the conventional sealing constitution is used, similarly as described in the embodiment 1, there is a possibility that the flow-out (scattering) of the toner from the toner region T to the outside due to generation of the gap portion B in the superposed region between the sealing members occurs. Therefore, also in the toner conveying potion 9 in this embodiment, the constitution of the superposed region between the end portions of the sealing members is made the same constitution as the constitution in the embodiment 1, so that it becomes possible to enhance the reliability of the sealing performance.

In the toner conveying portion 9 in this embodiment, each of the pair of lateral seals 7 and the pair of vertical seals 8 is a prism-like member substantially rectangular (substantially oblong shape long in side along a direction substantially perpendicular to the longitudinal direction of the hollow pipe portion 602) in cross section substantially perpendicular to the longitudinal direction of each of the lateral seals 7 and 8. Further, the pair of lateral seals 7 is fixed to a pair of opposing sides, respectively, of the sticking portion 611 of the toner guiding portion 6. Further, the pair of vertical seals 8 is fixed to another pair of opposing sides, respectively, of the sticking portion 611 of the toner guiding portion 6 so that both end portions of each seal 8 are superposed on the associated end portion of the seal 7 from the cap member 5 side. In this embodiment, each of these sealing members is stuck to the sticking portion 611 of the toner guiding portion 6 by a double-side tape as a fixing means.

Here, in this embodiment, the longitudinal direction of the pair of vertical seals 8 disposed along (in this embodiment, substantially parallel to) the pair of opposing sides of the sticking portion 611 (herein, referred to as the "X direction (first direction)").

Further, the longitudinal direction of the pair of lateral seals 7 disposed along (in this embodiment, substantially parallel to) another pair of opposing sides of the sticking portion 611 (herein, referred to as the "Y direction (second direction)"). In this embodiment, the X direction and the Y direction are substantially perpendicular to each other. Further, in this embodiment, each of the X direction and the Y direction is substantially perpendicular to the gravitational direction.

In this embodiment, the pair of lateral seals 7 is a prism-like member having a substantially entirely uniform cross section similarly as the blade back seal 3 in the embodiment 1. On the other hand, in this embodiment, the pair of vertical seals 8 is constituted so that both end portions of each vertical seal 8 with respect to the longitudinal direction are superposed end portions 820 each having the sealing shape in accordance with the present invention similarly as the superposed end portion 420 of the side seal 4 in the embodiment 1.

FIG. 18 is a front view of the toner conveying portion 9 viewed from the cap member 5 side along a direction substantially perpendicular to the X direction and the Y direction (in which the cap member 5 is omitted from illustration). With reference to FIG. 18, a sealing effect of the sealing members in this embodiment will be described. The constitutions of the pair of vertical seals 8 are the same, and therefore, description will be made by paying attention to one vertical seal 8 (on a left-hand side in FIG. 18). Further, in an example shown in FIG. 18, in an upper-left superposed region (hatched line portion in FIG. 18) between the sealing members, the "separated state" described in the embodiment 1 is formed, and in a lower-left superposed region (hatched line portion in FIG. 18) between the sealing members, the "approaching state" described in the embodiment 1 is formed.

Each of the superposed end portions 820 which are opposite end portions of the vertical seal 8 in the X direction is provided with first to fourth ridge lines 801, 802, 803, and 804 similarly as the superposed end portion 420 of the side seal 4 in the embodiment 1. That is, each of the superposed end portions 820 has two sealing shapes. In the upper-left superposed end portion 820 in the "separated state" in FIG. 18, a toner sealing portion 701 which is a ridge line along which the lateral seal 7 and the cap member 5 are in close contact with each other is formed in a position opposing the fourth ridge line 804 in the X direction with respect to a gap portion B (cross-hatched portion in FIG. 18) extending in the X direction from the toner region T. By this, the toner entering the gap portion B from the toner region T is blocked by the toner sealing portion 701, and therefore, flow-out of the toner from the toner region T to the outside is suppressed. Further, in the lower-left superposed end portion 820 in the "approaching state" in FIG. 18, the toner sealing portion 701 which is a ridge line along which the lateral seal 7 and the cap member 5 are close contact with each other is formed in a position opposing the second ridge line 802 in the X direction with respect to a gap portion B (cross-hatched portion in FIG. 18) extending in the X direction from the toner region T. By this, the toner entering the gap portion B from the toner region T is blocked by the toner sealing portion 701, and therefore, flow-out of the toner from the toner region T to the outside is suppressed. Further, as described in the embodiment 1, by setting the distance D smaller than the width W, even in any state from the "approaching state" to the "separated state", at least one ridge line of the second ridge line (seal ridge line) 802 and the fourth ridge line (seal ridge line) 804 is disposed on the lateral seal 7, and therefore, the flow-out of the toner from the toner region T to the outside can be suppressed. Particularly, by providing the sealing shape according to the present invention in each of both end portions of the vertical seal 8 in the X direction, in the case where one of the end portions is put in the "separated state" and the other end portion is put in the "approaching state", even in either end portion, it is possible to suppress the flow-out of the toner from the toner region T to the outside.

Incidentally, as the constitution of the superposed end portion 820 of the vertical seal 8 in this embodiment, the constitutions of the modified embodiments described in the embodiment 1 can be arbitrarily used.

Thus, in this embodiment, the developer accommodating device is the developer conveying portion (toner conveying portion) 9 in which the first member (toner guiding portion) 6 and the second member (cap member) 5 constitute, as the developer accommodating portion T, a region through which the developer passes. Further, according to this embodiment, the image forming apparatus 1 including the developer accommodating device 9 having such a constitution is provided.

As described above, also by applying the present invention to the toner conveying portion 9, an effect similar to the effect of the embodiment 1 can be obtained.

Embodiment 3

Next, another embodiment of the present invention will be described.

General constitution and operation of the image forming apparatus of this embodiment are those in the embodiment 1. However, in the image forming apparatus of this embodiment, elements having the same or corresponding functions or constitutions of those of the image forming apparatus in the embodiment 1 will be omitted from detailed description by adding thereto the same reference numerals or symbols as those in the embodiment 1.

In this embodiment, in a sealing constitution of a drum cartridge 10 similar to the drum cartridge 10 in the embodiment 1, another example of the superposed end portion 420 of the side seal 4 will be described.

In the embodiment 1, description that the flow-out of the toner from the toner region T to the outside can be suppressed by forming the toner sealing portion 301 so as to bend the traveling direction of the toner entering from the toner region T into the gap portion B was made with reference to FIGS. 9 and 10. In the embodiment 1, this was realized by providing the first to fourth ridge lines 401, 402, 403, and 404 in the superposed end portion 420 of the side seal 4.

On the other hand, a corresponding effect can be obtained by forming the toner sealing portion 301 by providing the superposed end portion 420 of the side seal 4 with a linear or curved ridge line continuous from the first ridge line 401 and by bending the traveling direction of the toner entering from the toner region T into the gap portion B.

FIG. 19 is a front view of the side seal 4 in this embodiment as viewed from the photosensitive drum 12 side along the direction substantially perpendicular to the X direction and the Y direction.

In this embodiment, in the case where the side seal 4 is viewed from the direction substantially perpendicular to the X direction and the Y direction, the superposed end portion 420 includes (a) the first ridge line 401 contacting the toner region T and extending along the X direction, and (b) a second ridge line 412 connected to the first ridge line 401 and extending so as to be positioned on the end side of the superposed ridge line 412 in the X direction with a distance from the first ridge line 401 in the direction substantially perpendicular to the X direction. By this, even in any state from the "approaching state" to the "separated state" which are described in the embodiment 1, in the case where the side seal 4 is viewed from the direction substantially perpendicular to the X direction and the Y direction, at least a part of the second ridge line 412 is nipped between the blade back seal 3 and the blade supporting member 141 in a state of being on the blade back seal 3. In this embodiment, in the case where the side seal 4 is viewed from the direction substantially perpendicular to the X direction and the Y direction, the second ridge line 412 has a linear shape. Further, in this embodiment, the second ridge line 412 extends so as to be spaced from the toner region T in the direction substantially perpendicular to the X direction.

According to the side seal 4 in this embodiment, the gap portion B is formed by the second ridge line 412, but in a region opposing the second ridge line 412 in the X direction, the toner sealing portion 301 is formed by close contact of the blade back seal 3 with the blade supporting member 141. Further, by the action of this toner sealing portion 301, the toner entering from the toner region T into the gap portion B is bent in traveling direction thereof toward a direction along the second ridge line 412. Thus, the traveling direction of the toner is bent, and the toner does not readily travel, so that the flow-out of the toner passed through the gap portion B does not readily occur.

Here, in order to satisfactorily obtain the above-described effect, in the case where the side seal 4 is viewed from the direction substantially perpendicular to the X direction and the Y direction an inclination angle of the second ridge line 412 with respect to the Y direction (in this embodiment, the direction substantially perpendicular to the X direction) may preferably be 30 degrees or more and 60 degrees or less. When this inclination angle is less than 30 degrees, a sticking error range of the side seal 4 satisfactorily providing the above-described effect becomes small in some instances. Further, when the inclination angle exceeds 60 degrees, it becomes difficult to sufficiently bend the toner traveling direction by the toner sealing portion 301 formed by the second ridge line 412.

Incidentally, in this embodiment, in the case where the side seal 4 is viewed from the direction substantially perpendicular to the X direction and the Y direction, the shape of the second ridge line 412 is the linear shape, but is not limited thereto. For example, as shown in parts (a) and (b) of FIG. 20, in the case where the side seal 4 is viewed from the direction substantially perpendicular to the X direction and the Y direction, the shape of the second ridge line 412 may be a curved shape. In the side seal 4 shown in part (a) of FIG. 20, the shape of the second ridge line 412 is a curved shape projected outwardly, and in the side seal 4 shown in part (b) of FIG. 20, the shape of the second ridge line 412 is a curved shape projected inwardly. Also, by such side seals 4, similarly as the side seal 4 in this embodiment, the toner traveling direction is bent by the toner sealing portion 301 formed by the second ridge line 412, so that the flow-out of the toner from the toner region T to the outside can be side sealed. In the case where the second ridge line 412 has the curved shape, an inclination angle of a tangential line, with respect to the Y direction, circumscribing at least a part from the first ridge line 401 to an approximately center of the second ridge line 412 in the direction substantially perpendicular to the X direction may preferably be 30 degrees or more and 60 degrees or less similarly as described above.

Further, in the side seal 4 in this embodiment, the second ridge line 412 extends so as to be spaced from the toner region T in the direction substantially perpendicular to the X direction, but is not limited thereto. As shown in part (c) of FIG. 20, the second ridge line 412 may extend so as to approach the toner region T in the direction substantially perpendicular to the X direction. Incidentally, also in this embodiment, the shape of the second ridge line 412 is not limited to the linear shape, but may also be the curved shape. Also, by such a side seal 4, similarly as the side seal 4 in this embodiment, the toner traveling direction is bent by the toner sealing portion 301 formed by the second ridge line 412, the flow-out of the toner from the toner region T to the outside can be suppressed.

Further, the side seals 4 described in this embodiment are also applicable to the toner conveying portion 9 described in the embodiment 2.

Thus, in this embodiment, in the case where the first sealing member 4 is viewed from the direction substantially perpendicular to the first direction X and the second direction Y, the superposed end portion 420 includes (a) the first ridge line 401 contacting the developer accommodating portion 19 and extending along the first direction X, and (b) a second ridge line 412 connected to the first ridge line 401 and extending so as to be positioned on the end side of the superposed ridge line 412 in the first direction X with a distance from the first ridge line 401 in the direction substantially perpendicular to the first direction X, and in the case where the superposed end portion 420 of the first sealing member 4 is viewed from the direction substantially perpendicular to the first direction X and the second direction Y, at least a part of the second ridge line 412 is nipped between the second sealing member 3 and the second member 141 in a state of being on the second sealing member 3. In this embodiment, in the case where the first sealing member 4 is viewed from the direction substantially perpendicular to the first direction X and the second direction Y, the second ridge line 412 extends so as to be spaced from the developer accommodating portion 19 in the direction substantially perpendicular to the first direction X. Further, in this embodiment, in the case where the first sealing member 4 is viewed from the direction substantially perpendicular to the first direction X and the second direction Y, the second ridge line 412 has a linear shape. Here, in the case where the first sealing member 4 is viewed from the direction substantially perpendicular to the first direction X and the second direction Y, the inclination angle of the second ridge line 412 with respect to the second direction Y may preferably be 30 degrees or more and 60 degrees or less. Incidentally, in the case where the first sealing member 4 is viewed from the direction substantially perpendicular to the first direction X and the second direction Y, the second ridge line 412 may have a curved line. Further, in this embodiment, the first direction X and the second direction Y are substantially perpendicular to each other.

As described above, also by the constitution of this embodiment, an effect similar to the effect of the embodiment 1 can be obtained correspondingly.

OTHER EMBODIMENTS

In the above, the present invention was described based on the specific embodiments, but the present invention is not limited to the above-described embodiments.

In the above-described embodiments, the developer accommodating device was described as that the toner is accommodated in (including "passing") the cleaning device or the developer accommodating portion of the toner conveying portion. However, in the developer accommodating portion, as the developer, a carrier or the like may be accommodated in addition to the toner. Further, in a collected developer or the like, a foreign matter such as power powder may be contained.

Further, in the above-described embodiments, the sealing member was described as being fixed to a fixing object by the double-side tape, but may also be fixed by using another fixing means such as contact or welding.

Further, in the above-described embodiments, as an example of the developer accommodating device, the cleaning device for cleaning the photosensitive drum and the toner conveying portion were described, but the present invention is not limited thereto.

For example, the cleaning device may clean another cleaning object such as the intermediary transfer belt. Further, the developer accommodating device may be the developing device, the developer accommodating container, a collected developer container, and the like. The present invention is applicable to a sealing constitution of an arbitrary developer accommodating device which is used in the image forming apparatus and which temporarily accommodates (including "passing") the developer.

According to the present invention, in a constitution in which the plurality of sealing member are used for sealing the developer existing region, reliability of the sealing performance can be enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-217492 filed on Dec. 23, 2023, which is hereby incorporated by reference herein in its entirety.

What is claimed is:

1. A developer accommodating container comprising:

a first member configured to form an accommodating portion for accommodating developer;

a second member mounted to the first member and configured to form the accommodating portion;

a first seal extended along a first direction at a periphery of the accommodating portion and configured to seal between the first member and the second member by being nipped between the first member and the second member so as to be elastically deformed; and a second seal extended along a second direction crossing the first direction at the periphery of the accommodating portion and configured to seal between the first member and the second member by being nipped between the first member and the second member so as to be elastically deformed, wherein the first seal includes one end portion and the other end portion with respect to the first direction, wherein at least a part of the one end portion of the first seal is nipped between the first member and the second member so as to be elastically deformed in a state of being superposed on the second seal, wherein the one end portion of the first seal includes a first ridge line extending along the first direction, a second ridge line extending from the first ridge line along a direction crossing the first ridge line so as to be spaced from the accommodating portion in the second direction, a third ridge line extending from the second ridge line along a direction crossing the second ridge line, and a fourth ridge line extending from the third ridge line along a direction crossing the third ridge line so as to be spaced from the accommodating portion in the second direction, wherein a first corner formed by the first ridge line and the second ridge line is positioned closer to the other end portion of the first seal than a second corner formed by the third ridge line and the fourth ridge line is, wherein an interval between the first corner and the second corner in the first direction is shorter than a width, in the first direction, of a region where the first seal is superposed on the second seal, and wherein at least one of the first corner and the second corner is nipped between the first member and the second member so as to be elastically deformed in a state of being superposed on the second seal.

2. A developer accommodating container according to claim 1, wherein each of the second ridge line and the fourth ridge line extends in a direction substantially perpendicular to the first direction.

3. A developer accommodating container according to claim 1, wherein the first direction is along a gravitational direction, and the one end portion of the first seal is a lower end portion of the first seal with respect to the gravitational direction.

4. A developer accommodating container according to claim 3, wherein at least one of the second ridge line and the fourth ridge line is inclined so as to be positioned above in the gravitational direction with a distance from the accommodating portion in a direction substantially perpendicular to the first direction.

5. A developer accommodating container according to claim 1, wherein the first direction and the second direction are substantially perpendicular to each other.

6. A developer accommodating container according to claim 1, further comprising:

a cleaning member configured to remove the developer from an image bearing member for bearing a developer image;

a supporting member configured to support the cleaning member; and a container capable of accommodating the developer removed from the image bearing member by the cleaning member, wherein the first member is the container, and the second member is the supporting member.

7. A developer accommodating container according to claim 1, wherein the first member and the second member are a developer conveying portion constituting a region, as the accommodating portion, through which the developer passes.

8. An image forming apparatus comprising:

a developer accommodating container according to claim 1; and an image forming portion configured to form a developer image.

9. A developer accommodating container comprising:

a first member configured to form an accommodating portion for accommodating a developer;

a second member mounted to the first member and configured to form the accommodating portion;

a first seal extended along a first direction at a periphery of the accommodating portion and configured to seal between the first member and the second member by being nipped between the first member and the second member so as to be elastically deformed; and a second seal extended along a second direction crossing the first direction at the periphery of the accommodating portion and configured to seal between the first member and the second member by being nipped between the first member and the second member so as to be elastically deformed, wherein the first seal includes one end portion and the other end portion with respect to the first direction, wherein at least a part of the one end portion of the first seal is nipped between the first member and the second member so as to be elastically deformed in a state of being superposed on the second seal, wherein the one end portion of the first seal includes a first ridge line extending along the first direction, and a second ridge line continuous to the first ridge line and extending so as to be away from the other end portion in the first direction with a distance from the first ridge line in a direction substantially perpendicular to the first direction, wherein an inclination angle of the second ridge line with respect to the second direction is 30 degrees or more and 60 degrees or less, and wherein the one end portion of the first seal is nipped between the first member and the second member so as to be elastically deformed in a state in which at least a part of the second ridge line is superposed on the second seal.

10. A developer accommodating container comprising:

a first member configured to form an accommodating portion for accommodating a developer;

a second member mounted to the first member and configured to form the accommodating portion;

a first seal extended along a first direction at a periphery of the accommodating portion and configured to seal between the first member and the second member by being nipped between the first member and the second member so as to be elastically deformed; and a second seal extended along a second direction crossing the first direction at the periphery of the accommodating portion and configured to seal between the first member and the second member by being nipped between the first member and the second member so as to be elastically deformed, wherein a ridge portion is disposed on a side of an accommodating portion of the first seal, with the ridge portion including:

a first ridge line;

a second ridge line extending from the first ridge line in a direction intersecting the first ridge line;

a third ridge line extending from the second ridge line in a direction intersecting the second ridge line; and a fourth ridge line extending from the third ridge line in a direction intersecting the third ridge line;

wherein a first corner defined by the first ridge line and the second ridge line is positioned closer to the other end portion of the first seal than is a second corner defined by the third ridge line and the fourth ridge line;

wherein an interval between the first corner and the second corner in a first direction is shorter than a width of the second seal in the first direction within a region where the first seal overlaps the second seal; and wherein at least one of the first corner and the second corner is nipped between the first member and the second member so as to be elastically deformed while being superposed on the second seal.

11. A developer accommodating container according to claim 10, wherein each of the second ridge line and the fourth ridge line extends in a direction substantially perpendicular to the first direction.

12. A developer accommodating container according to claim 10, wherein the first direction is along a gravitational direction.

13. A developer accommodating container according to claim 12, wherein at least one of the second ridge line and the fourth ridge line is inclined so as to be positioned above in the gravitational direction with a distance from the accommodating portion in a direction substantially perpendicular to the first direction.

14. A developer accommodating container according to claim 10, wherein the first direction and the second direction are substantially perpendicular to each other.

15. A developer accommodating container according to claim 10, further comprising:

a cleaning member configured to remove the developer from an image bearing member for bearing a developer image;

a supporting member configured to support the cleaning member; and a container capable of accommodating the developer removed from the image bearing member by the cleaning member, wherein the first member is the container, and the second member is the supporting member.

16. A developer accommodating container according to claim 10, wherein the first member and the second member are a developer conveying portion constituting a region, as the accommodating portion, through which the developer passes.

17. An image forming apparatus comprising:

a developer accommodating container according to claim 10; and an image forming portion configured to form a developer image.

* * * * *